(12) United States Patent
Nose et al.

(10) Patent No.: US 7,042,652 B2
(45) Date of Patent: May 9, 2006

(54) IMAGE-TAKING APPARATUS

(75) Inventors: Hiromichi Nose, Sakai (JP); Mamoru Terada, Sakai (JP); Atsuo Masui, Sakai (JP)

(73) Assignee: Konica Minolta Photo Imaging, Inc., Tokyo (JP)

( * ) Notice: Subject to any disclaimer, the term of this patent is extended or adjusted under 35 U.S.C. 154(b) by 57 days.

(21) Appl. No.: 10/877,444

(22) Filed: Jun. 25, 2004

(65) Prior Publication Data

US 2005/0200972 A1  Sep. 15, 2005

(30) Foreign Application Priority Data

Mar. 11, 2004  (JP)  ............... 2004-069335

(51) Int. Cl.
*G02B 15/14* (2006.01)

(52) U.S. Cl. ...................... 359/689; 359/682

(58) Field of Classification Search ........ 359/680–682, 359/689
See application file for complete search history.

(56) References Cited

U.S. PATENT DOCUMENTS 6,532,114 B1  3/2003  Kohno et al. ............... 359/689

6,735,020 B1 *  5/2004  Sekita ....................... 359/682

FOREIGN PATENT DOCUMENTS

JP  2003-177314 (A)  6/2003
JP  2003-228002 (A)  8/2003

* cited by examiner

*Primary Examiner*—Georgia Epps
*Assistant Examiner*—William Choi
(74) *Attorney, Agent, or Firm*—Sidley Austin Brown & Wood LLP

(57) ABSTRACT

A zoom lens system for forming an optical image of a subject on the image-sensing surface of an image sensor has three lens units, namely, from the object side thereof, a first lens unit having a negative optical power, a second lens unit having a positive optical power, and a third lens unit having a positive optical power, and achieves zooming by varying the distances between the individual lens units in such a way that, during zooming from the wide-angle end to the telephoto end, the distance between the first and second lens units decreases. The first lens unit is composed of two or more lens elements, and the first lens element, i.e., the lens element disposed at the object-side end of the first lens unit, and the last lens element, i.e., the lens element disposed at the image-side end of the third lens unit, are plastic lens elements. Moreover, a prescribed conditional formula is fulfilled.

20 Claims, 13 Drawing Sheets

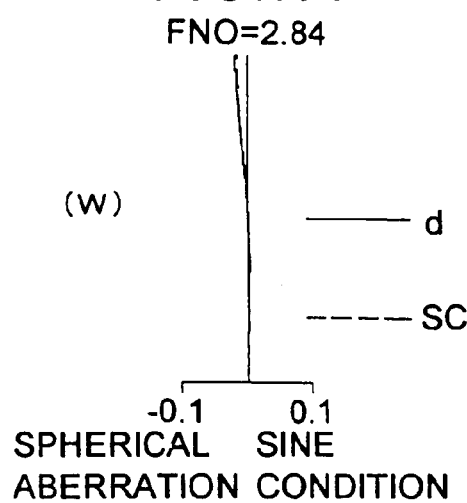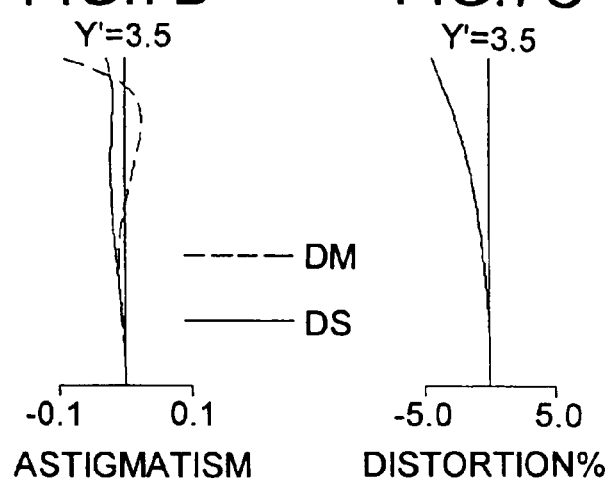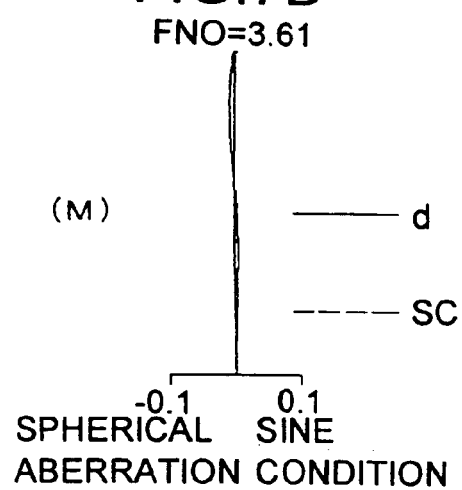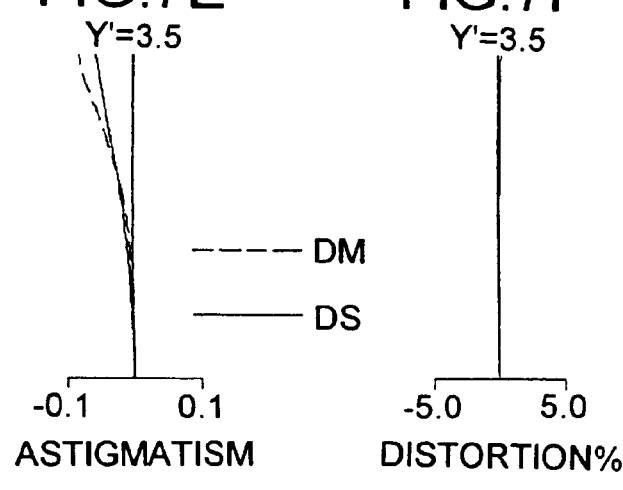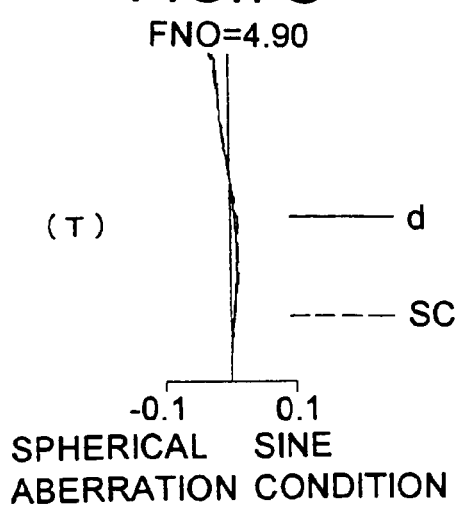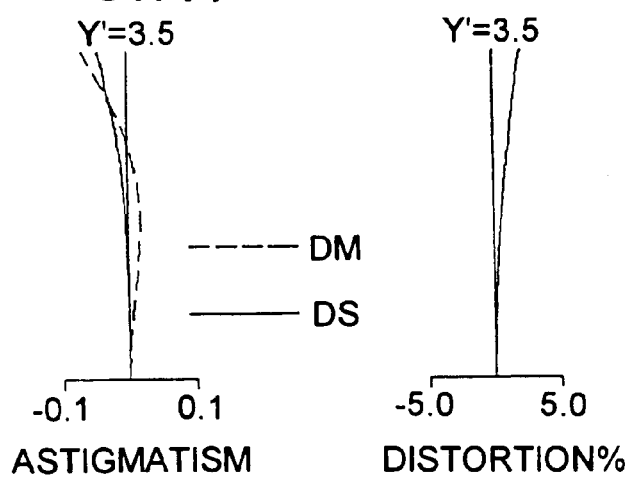

FNO=2.82

(W)
— d
---- SC

-0.1  0.1
SPHERICAL SINE
ABERRATION CONDITION

Y'=3.5

---- DM
— DS

-0.1  0.1
ASTIGMATISM

Y'=3.5

-5.0  5.0
DISTORTION%

FNO=3.59

(M)
— d
---- SC

-0.1  0.1
SPHERICAL SINE
ABERRATION CONDITION

Y'=3.5

---- DM
— DS

-0.1  0.1
ASTIGMATISM

Y'=3.5

-5.0  5.0
DISTORTION%

FNO=4.90

(T)
— d
---- SC

-0.1  0.1
SPHERICAL SINE
ABERRATION CONDITION

Y'=3.5

---- DM
— DS

-0.1  0.1
ASTIGMATISM

Y'=3.5

-5.0  5.0
DISTORTION%

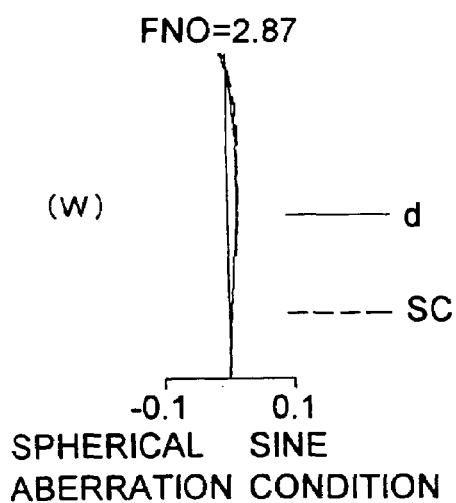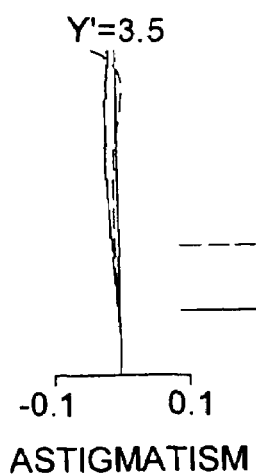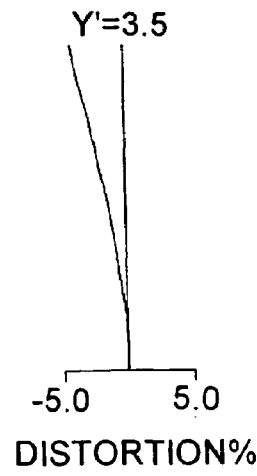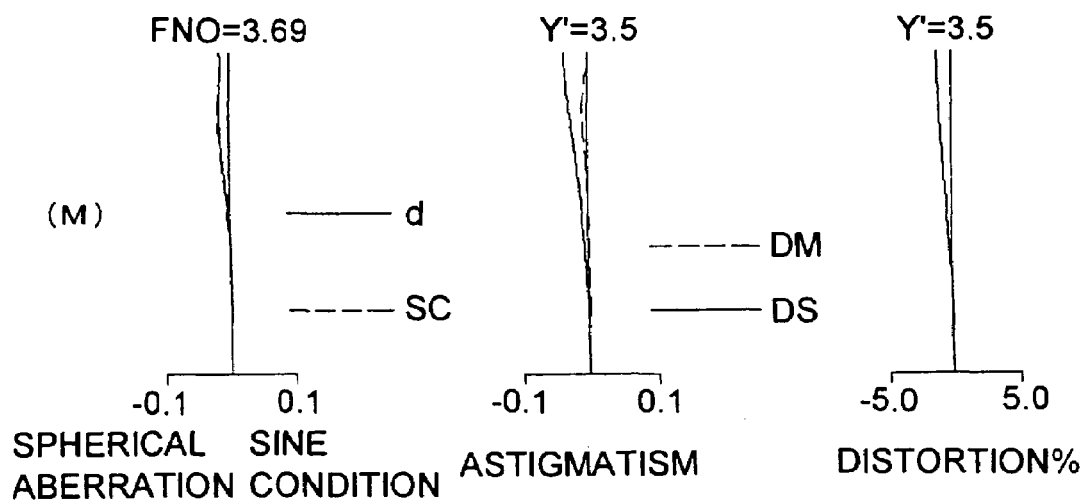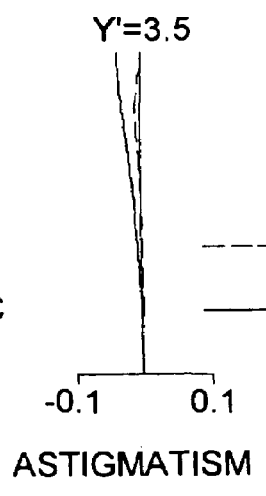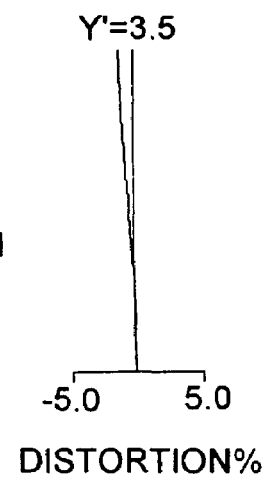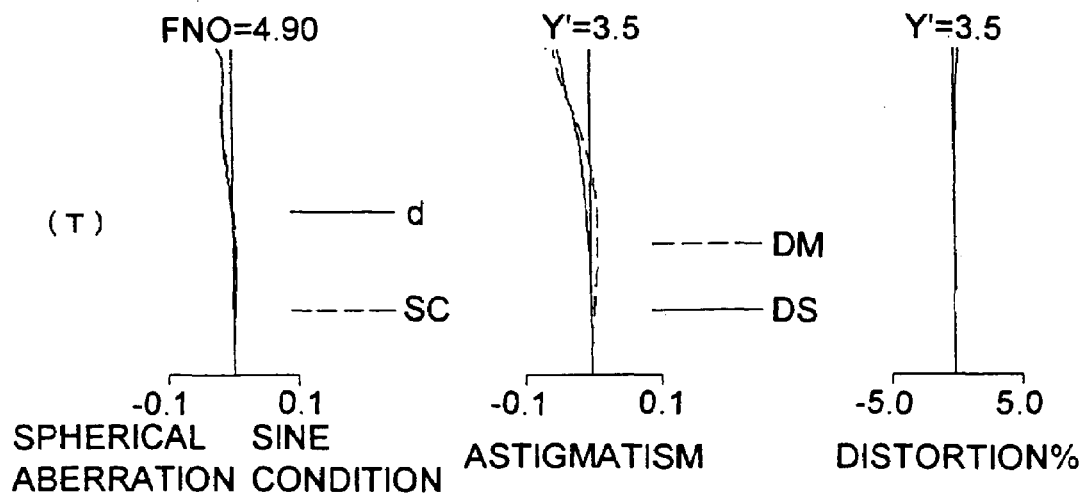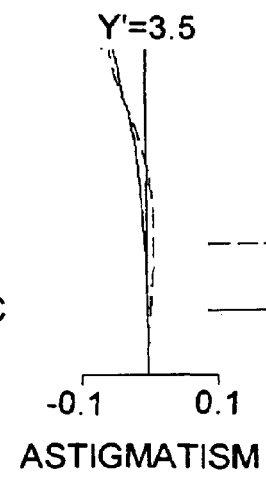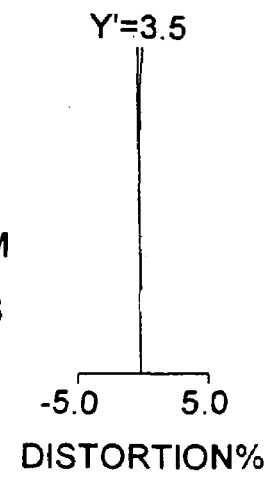

FNO=2.81

(W)
— d
---- SC

-0.1  0.1
SPHERICAL SINE
ABERRATION CONDITION

Y'=3.5

---- DM
— DS

-0.1  0.1
ASTIGMATISM

Y'=3.5

-5.0  5.0
DISTORTION%

FNO=3.69

(M)
— d
---- SC

-0.1  0.1
SPHERICAL SINE
ABERRATION CONDITION

Y'=3.5

---- DM
— DS

-0.1  0.1
ASTIGMATISM

Y'=3.5

-5.0  5.0
DISTORTION%

FNO=4.90

(T)
— d
---- SC

-0.1  0.1
SPHERICAL SINE
ABERRATION CONDITION

Y'=3.5

---- DM
— DS

-0.1  0.1
ASTIGMATISM

Y'=3.5

-5.0  5.0
DISTORTION%

FNO=2.77

(W)
— d
---- SC

-0.1  0.1
SPHERICAL  SINE
ABERRATION  CONDITION

Y'=3.5

---- DM
— DS

-0.1  0.1
ASTIGMATISM

Y'=3.5

-5.0  5.0
DISTORTION%

FNO=3.71

(M)
— d
---- SC

-0.1  0.1
SPHERICAL  SINE
ABERRATION  CONDITION

Y'=3.5

---- DM
— DS

-0.1  0.1
ASTIGMATISM

Y'=3.5

-5.0  5.0
DISTORTION%

FNO=4.90

(T)
— d
---- SC

-0.1  0.1
SPHERICAL  SINE
ABERRATION  CONDITION

Y'=3.5

---- DM
— DS

-0.1  0.1
ASTIGMATISM

Y'=3.5

-5.0  5.0
DISTORTION%

FNO=2.87
(W)
— d
---- SC
-0.1  0.1
SPHERICAL SINE
ABERRATION CONDITION

Y'=3.5
---- DM
— DS
-0.1  0.1
ASTIGMATISM

Y'=3.5
-5.0  5.0
DISTORTION%

FNO=3.54
(M)
— d
---- SC
-0.1  0.1
SPHERICAL SINE
ABERRATION CONDITION

Y'=3.5
---- DM
— DS
-0.1  0.1
ASTIGMATISM

Y'=3.5
-5.0  5.0
DISTORTION%

FNO=4.90
(T)
— d
---- SC
-0.1  0.1
SPHERICAL SINE
ABERRATION CONDITION

Y'=3.5
---- DM
— DS
-0.1  0.1
ASTIGMATISM

Y'=3.5
-5.0  5.0
DISTORTION%

IMAGE-TAKING APPARATUS

This application is based on Japanese Patent Application No. 2004-069335 filed on Mar. 11, 2004, the contents of which are hereby incorporated by reference.

BACKGROUND OF THE INVENTION

1. Field of the Invention

The present invention relates to an image-taking apparatus, and more particularly to an image-taking apparatus that takes in an image of a subject optically through a zoom lens system and then outputs it in the form of an electrical signal by means of an image sensor, and among others to an image-taking apparatus provided with a compact, light-weight zoom lens system.

2. Description of the Prior Art

Today, digital cameras are quite popular. Digital cameras dispense with silver-halide film, and use instead an image sensor such as a CCD (charge-coupled device) or CMOS (complementary metal oxide semiconductor) sensor to convert an optical image into an electrical signal so that the optical image can be recorded and transferred in the form of digital data. A digital camera incorporates an image-taking apparatus provided with a lens system and an image sensor, and, in recent years, such image sensors have come to have increasingly large numbers of pixels. Correspondingly, the demand for high-performance image-taking apparatuses has been increasing greatly. Among others, compact image-taking apparatuses have been eagerly sought after that incorporate a zoom lens system that permits zooming without degrading image quality. In addition, in recent years, as the image processing performance of semiconductor devices and the like increases, more and more personal computers, mobile computers, cellular phones, personal digital assistants (PDAs), and the like have come to be internally or externally fitted with an image-taking apparatus having a zooming capability. This has been spurring on the demand for compact, high-performance image-taking apparatuses.

To make an image-taking apparatus compact, the zoom lens system incorporated therein needs to be made compact. Thus, many zoom lens systems have been proposed that aim at compactness. For example, three-unit zoom lens systems composed of three lens units, namely, from the object side thereof, a first lens unit having a negative optical power, a second lens unit having a positive optical power, and a third lens unit having a positive optical power are proposed in the following patent publications:

Publication 1: U.S. Pat. No. 6,532,114
Publication 2: Japanese Patent Application Laid-Open No. 2003-228002
Publication 3: Japanese Patent Application Laid-Open No. 2003-177314

This type of zoom lens system, composed of a small number of optical elements and having a comparatively simple movement mechanism, has the advantage of being suitable to be made compact and other advantages.

Publication 1 discloses zoom lens systems in which plastic lens elements are used as the most object-side lens element and as the most image-side lens element. Using plastic lenses makes introduction of aspherical surfaces easy, and helps reduce costs. However, with the constructions disclosed in Publication 1, it is difficult to achieve compactness while maintaining high optical performance. For example, in Examples 8 and 10 presented in Publication 1, plastic lens elements are used as the first and last lens elements. Here, however, the optical power of the first lens element is too weak to achieve satisfactory compactness. In the zoom lens system disclosed in Publication 2, a glass-molded lens element is used to introduce an aspherical surface. This, disadvantageously, increases costs. In the zoom lens system disclosed in Publication 3, although a plastic lens element is used to introduce an aspherical surface, the first lens unit is composed of a single lens element, and this makes correction of off-axial aberrations difficult.

SUMMARY OF THE INVENTION

An object of the present invention is to provide an image-taking apparatus incorporating a zoom lens system that helps achieve compactness and low costs while maintaining high optical performance.

To achieve the above object, according to one aspect of the present invention, in a zoom lens system for forming an optical image of a subject on the image-sensing surface of an image sensor, the zoom lens system is provided with three lens units, namely, from the object side thereof, a first lens unit having a negative optical power, a second lens unit having a positive optical power, and a third lens unit having a positive optical power, and the zoom lens system achieves zooming by varying the distances between the individual lens units in such a way that, during zooming from the wide-angle end to the telephoto end, the distance between the first and second lens units decreases. Moreover, the first lens unit is composed of two or more lens elements, and the first lens element, i.e., the lens element disposed at the object-side end of the first lens unit, and the last lens element, i.e., the lens element disposed at the image-side end of the third lens unit, are plastic lens elements. Furthermore, the following conditional formula (1) is fulfilled:

$$1 < |f1/fw| < 3 \tag{1}$$

where $f1$ represents the focal length of the first lens element; and
$fw$ represents the focal length of the zoom lens system as a whole at the wide-angle end.

According to another aspect of the present invention, in an image-taking apparatus provided with a zoom lens system that is composed of a plurality of lens units and that achieves zooming by varying the distances between the lens units and an image sensor that converts the optical image formed by the zoom lens system into an electrical signal, the zoom lens system is constructed as described in the preceding paragraph.

According to still another aspect of the present invention, in a camera provided with an image-taking apparatus that takes in an image of a subject optically and then outputs it in the form of an electrical signal, the image-taking apparatus is constructed as described in the preceding paragraph.

BRIEF DESCRIPTION OF THE DRAWINGS

This and other objects and features of the present invention will become clear from the following description, taken in conjunction with the preferred embodiments with reference to the accompanying drawings in which:

FIGS. 7A to 7I are aberration diagrams of Example 1;
FIGS. 9A to 9I are aberration diagrams of Example 3.

DESCRIPTION OF THE PREFERRED EMBODIMENTS

Hereinafter, image-taking apparatuses and the like embodying the present invention will be described with reference to the drawings. An image-taking apparatus according to the invention is an optical apparatus that optically takes in an image of a subject and then outputs it in the form of an electrical signal. Such an image-taking apparatus is used as a main component of a camera that is used to shoot a still or moving picture of a subject. Examples of such cameras include digital cameras, video cameras, surveillance cameras, car-mounted cameras, cameras for videophones, cameras for intercoms, and cameras incorporated in or externally fitted to personal computers, mobile computers, cellular phones, personal digital assistants (PDAs), peripheral devices therefor (such as mouses, scanners, and printers), and other digital devices. As these examples show, by the use of an image-taking apparatus, it is possible not only to build a camera but also to incorporate an image-taking apparatus in various devices to provide them with a camera capability. For example, it is possible to realize a digital device provided with an image input capability, such as a cellular phone furnished with a camera.

Incidentally, the term "digital camera" in its conventional sense denotes one that exclusively records optical still pictures, but, now that digital still cameras and home-use digital movie cameras that can handle both still and moving pictures have been proposed, the term has come to be used to denote either type. Accordingly, in the present specification, the term "digital camera" denotes any camera that includes as its main component an image-taking apparatus provided with an image-taking lens system for forming an optical image, an image sensor for converting the optical image into an electrical signal, and other components, examples of such cameras including digital still cameras, digital movie cameras, and Web cameras (i.e., cameras that are connected, either publicly or privately, to a device connected to a network to permit exchange of images, including both those connected directly to a network and those connected to a network by way of a device, such as a personal computer, having an information processing capability).

Figure 1:
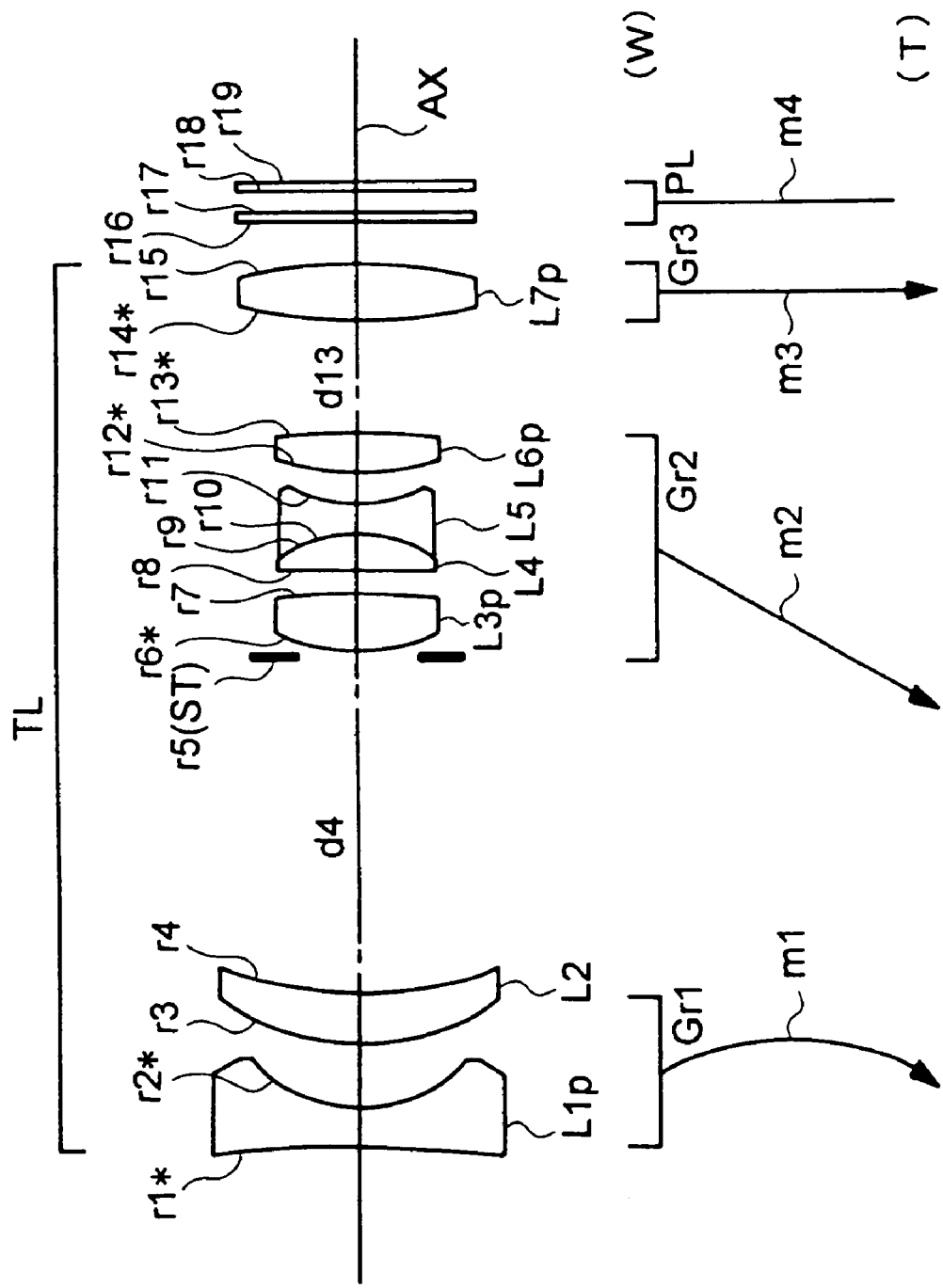
FIG. 1 is a lens construction diagram of a first embodiment (Example 1) of the invention.
Figure 2:
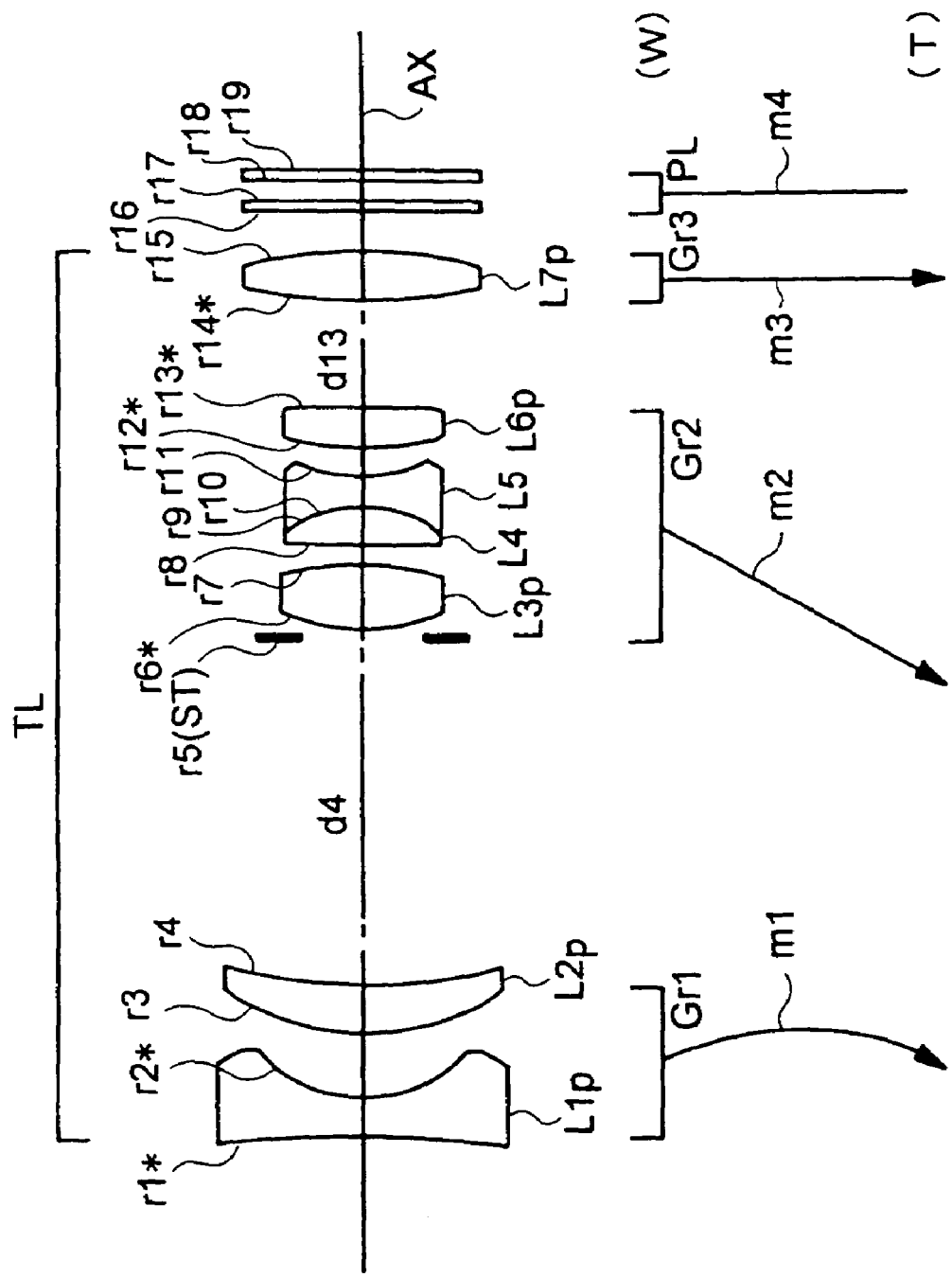
FIG. 2 is a lens construction diagram of a second embodiment (Example 2) of the invention.
Figure 3:
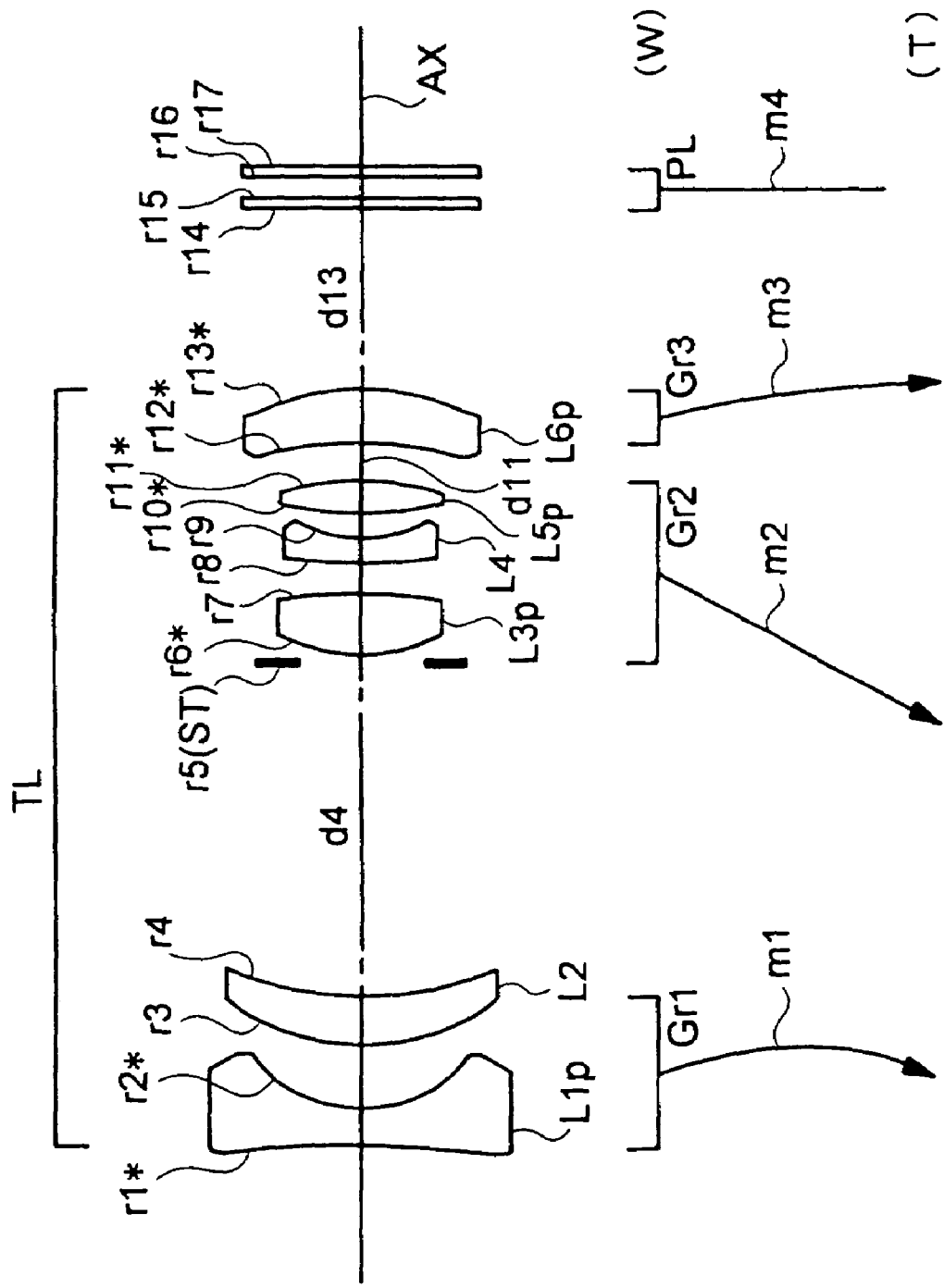
FIG. 3 is a lens construction diagram of a third embodiment (Example 3) of the invention.
Figure 4:
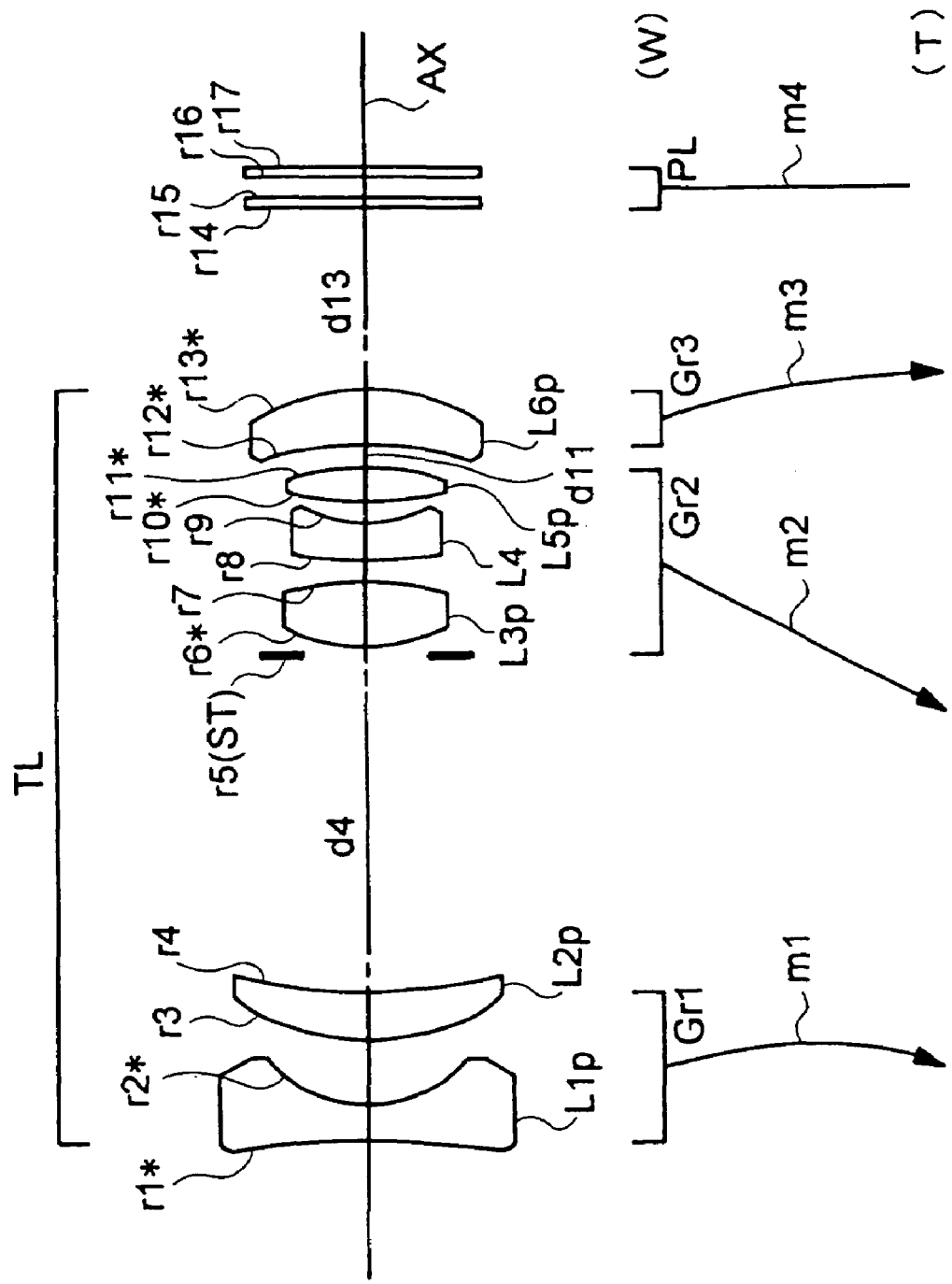
FIG. 4 is a lens construction diagram of a fourth embodiment (Example 4) of the invention.
Figure 5:
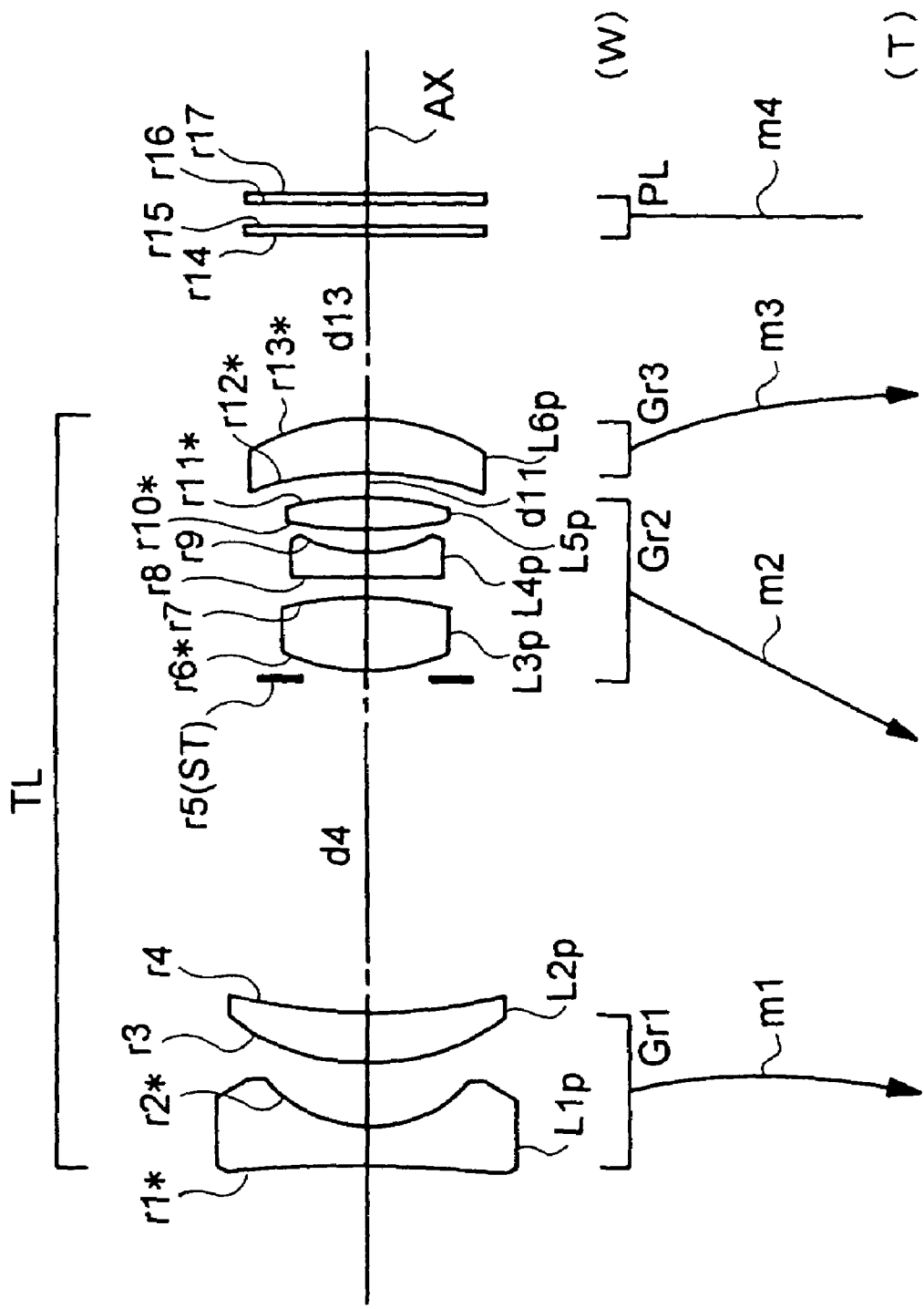
FIG. 5 is a lens construction diagram of a fifth embodiment (Example 5) of the invention.
Figure 6:
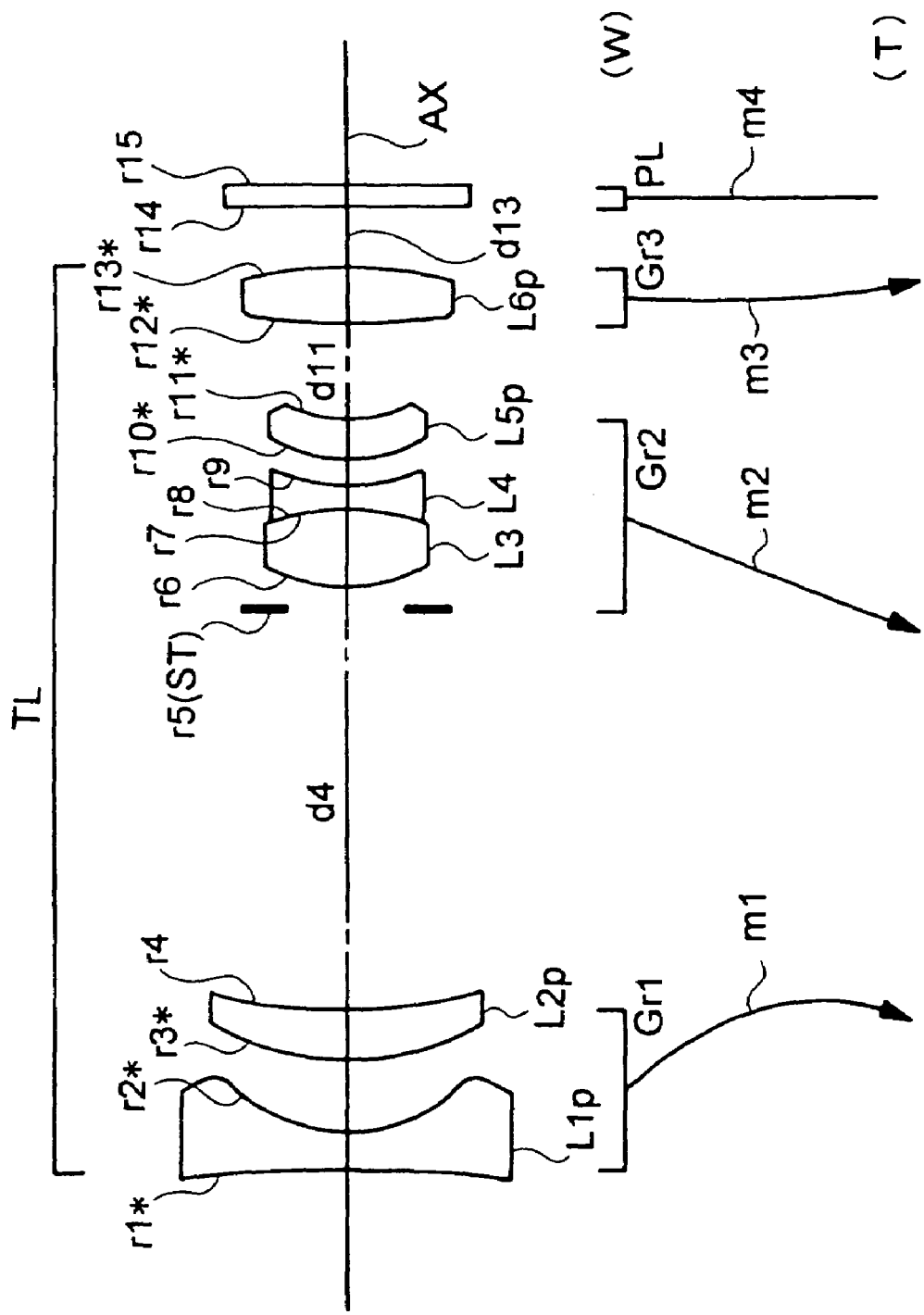
FIG. 6 is a lens construction diagram of a sixth embodiment (Example 6) of the invention.
Figure 8A:
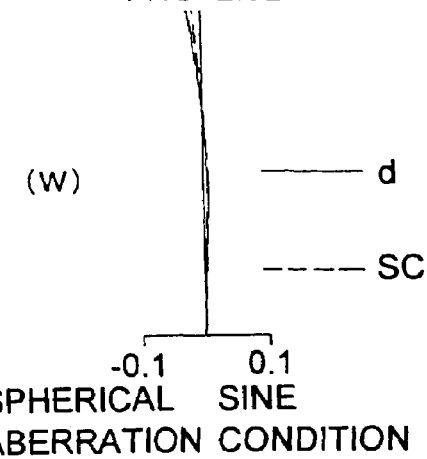
FIGS. 8A to 8I are aberration diagrams of Example 2.
Figure 8B:
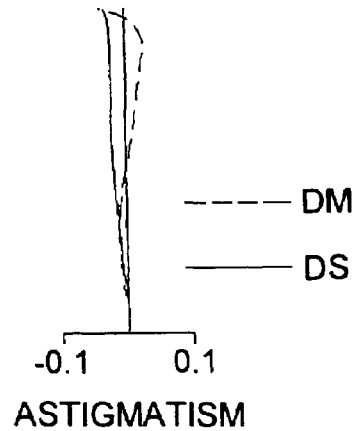
Figure 8C:
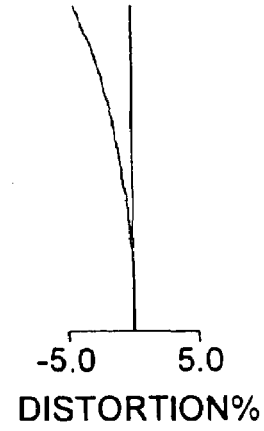
Figure 8D:
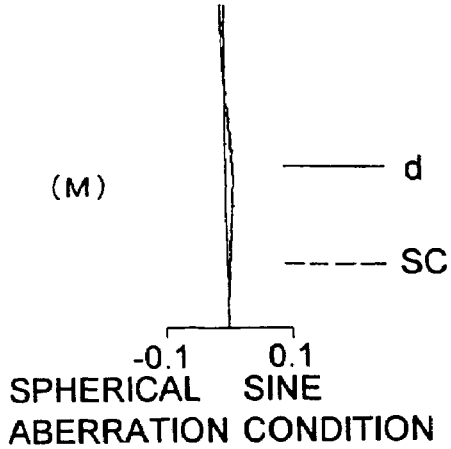
Figure 8E:
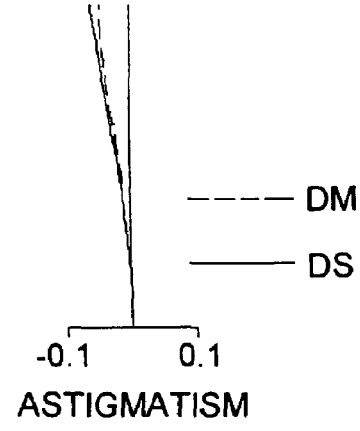
Figure 8F:
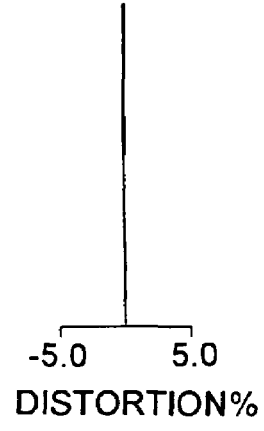
Figure 8G:
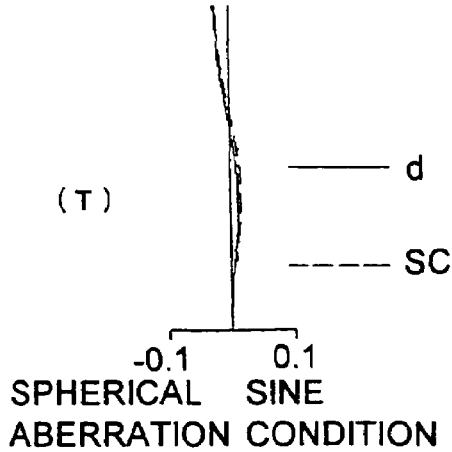
Figure 8H:
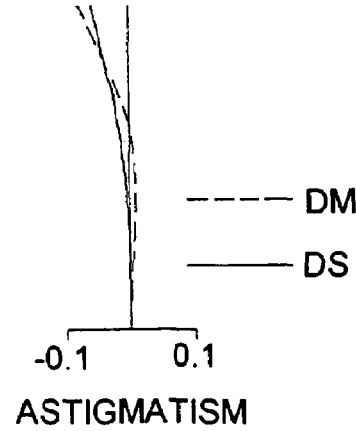
Figure 8I:
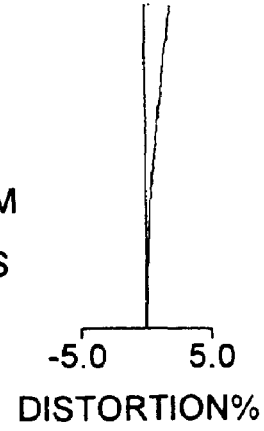
Figure 10A:
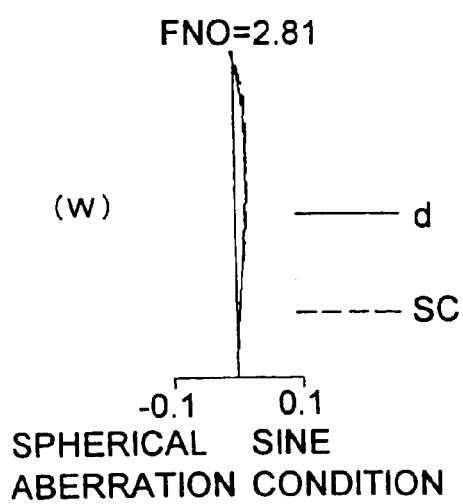
FIGS. 10A to 10I are aberration diagrams of Example 4.
Figure 10B:
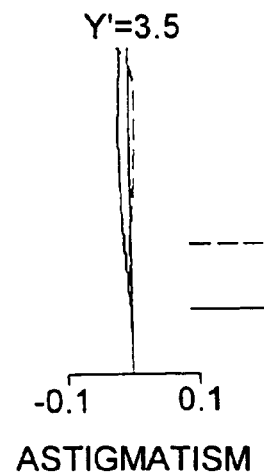
Figure 10C:
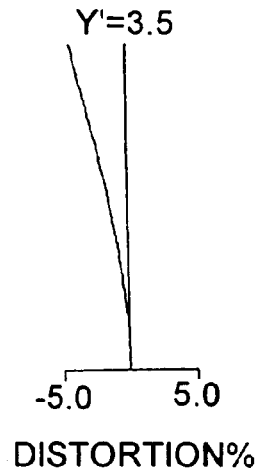
Figure 10D:
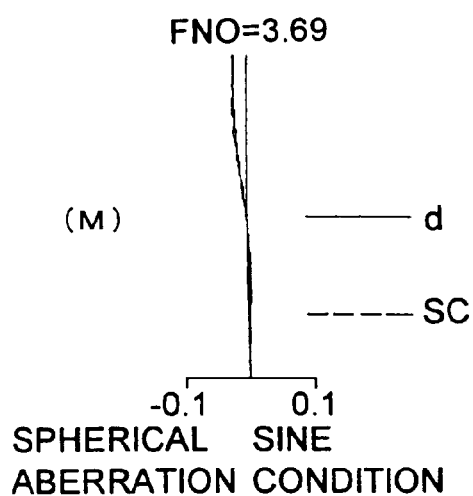
Figure 10E:
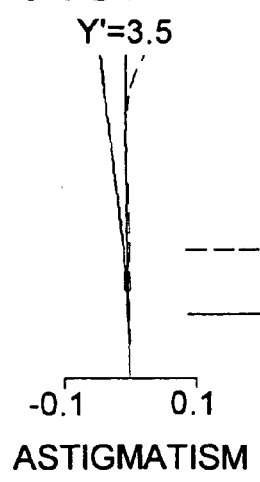
Figure 10F:
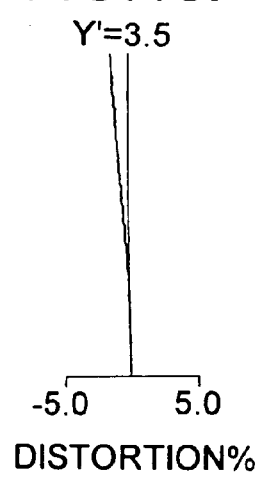
Figure 10G:
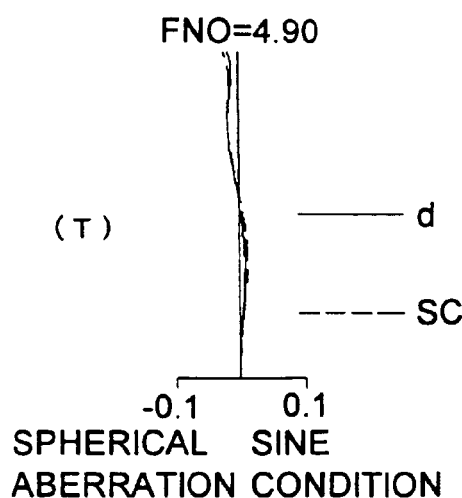
Figure 10H:
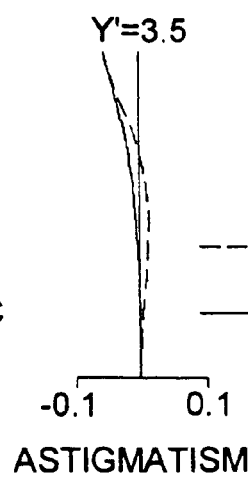
Figure 10I:
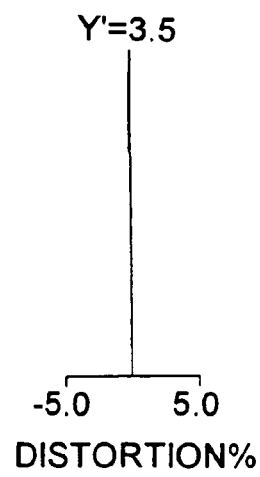
Figure 11A:
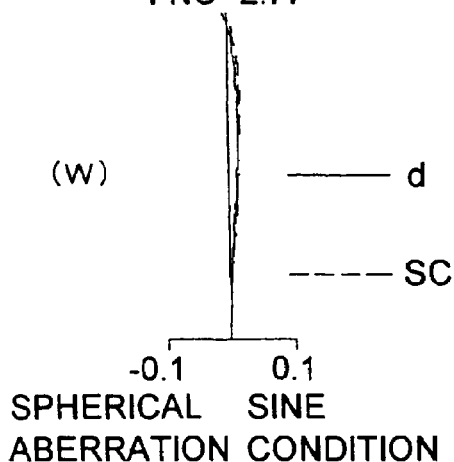
FIGS. 11A to 11I are aberration diagrams of Example 5.
Figure 11B:
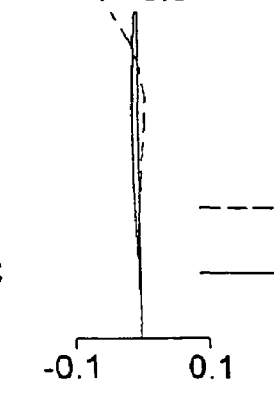
Figure 11C:
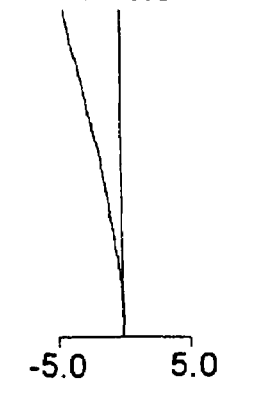
Figure 11D:
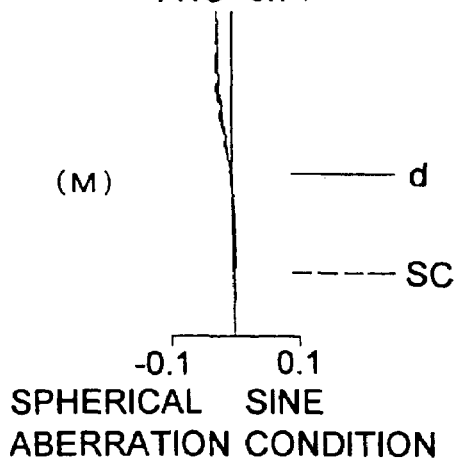
Figure 11E:
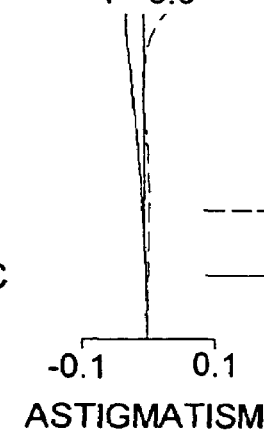
Figure 11F:
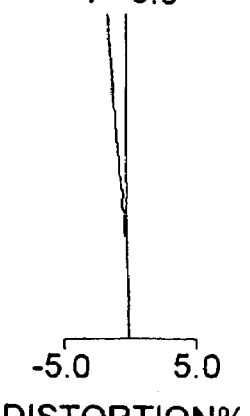
Figure 11G:
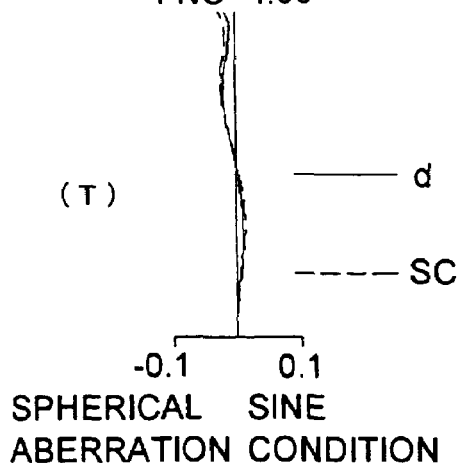
Figure 11H:
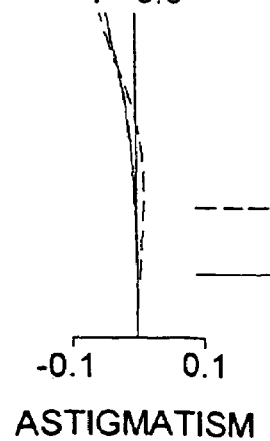
Figure 11I:
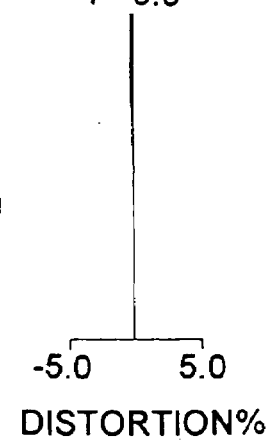
Figure 12A:
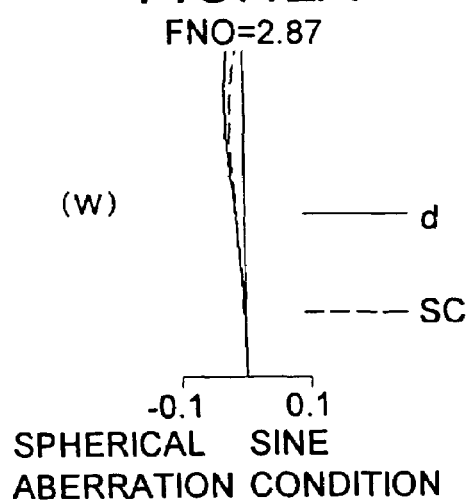
FIGS. 12A to 12I are aberration diagrams of Example 6.
Figure 12B:
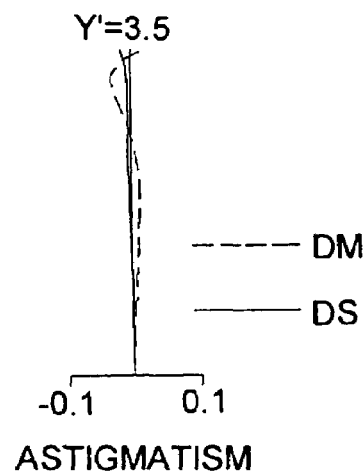
Figure 12C:
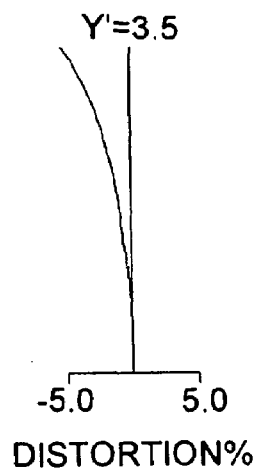
Figure 12D:
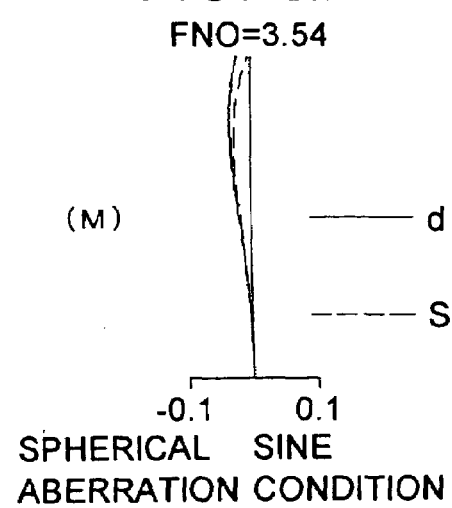
Figure 12E:
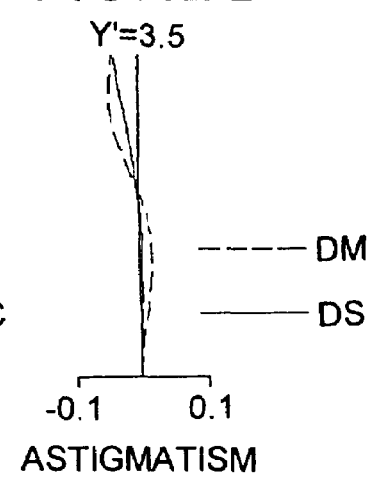
Figure 12F:
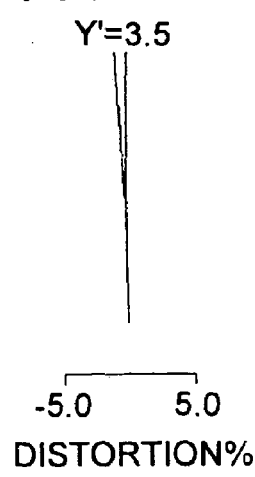
Figure 12G:
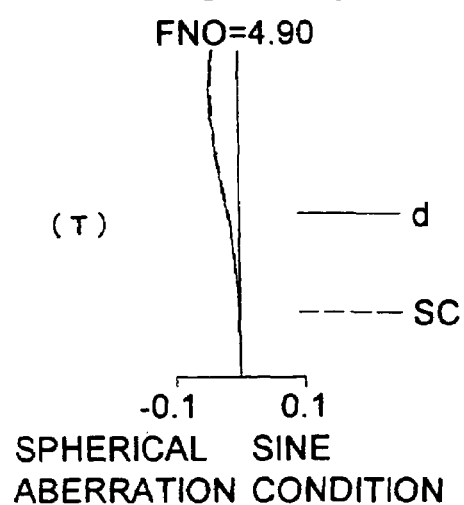
Figure 12H:
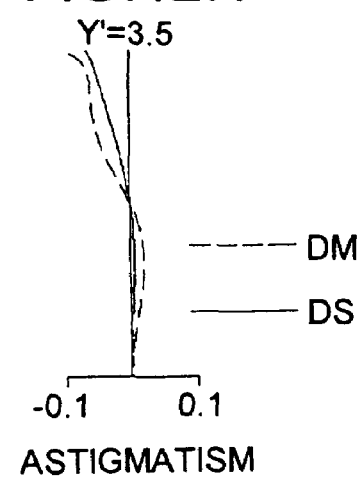
Figure 12I:
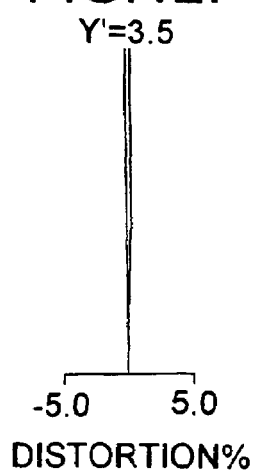
Figure 13:
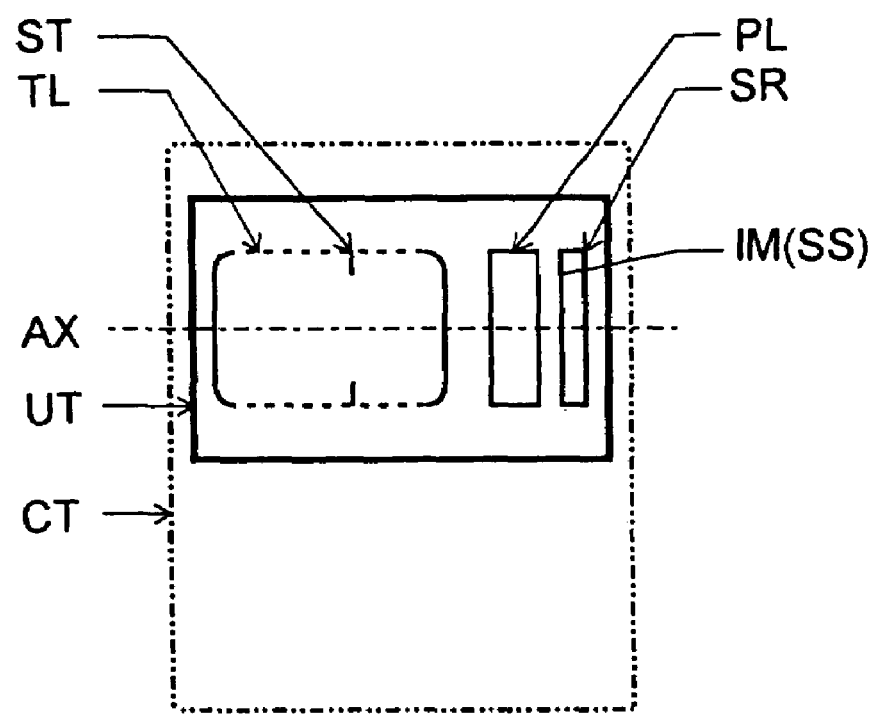
FIG. 13 is a diagram schematically showing an outline of the optical construction of an image-taking apparatus according to the invention.

FIG. 13 shows an example of the construction of an image-taking apparatus UT. This image-taking apparatus UT is composed of, from the object (i.e., subject) side thereof, a zoom lens system TL (corresponding to an image-taking lens system) for forming an optical image (image plane IM) of an object at a variable magnification, a parallel-plane plate PL (corresponding to an optical filter such as an optical low-pass filter or infrared cut filter arranged as required, and to the cover glass of an image sensor SR), and an image sensor SR for converting the optical image IM formed on the light-receiving surface SS thereof by the zoom lens system TL into an electrical signal. The image-taking apparatus UT is used as a component of a digital device CT corresponding to a digital camera, portable data device (i.e., a compact and portable data equipment terminal such as a cellular phone or PDA), or the like. When this image-taking apparatus UT is incorporated in a digital camera, the image-taking apparatus UT is usually arranged inside the body of the camera. Here, the camera capability can be realized in a desired manner that suits particular needs. For example, the image-taking apparatus UT may be built as a unit that is freely detachable from or freely rotatable relative to the body of the camera; or the image-taking apparatus UT may be built as a unit that is freely detachable from or freely rotatable relative to a portable data device (such as a cellular phone or PDA).

The zoom lens system TL is composed of a plurality of lens units, and is so constructed as to vary the magnification (i.e., achieve zooming) by moving those lens units along the optical axis AX in such a way as to vary the distances between them. In all the embodiments described later, the zoom lens system TL has a three-unit zoom construction composed of a negative, a positive, and a positive optical power. Used as the image sensor SR is, for example, a solid-state image sensor such as a CCD (charge-coupled device) or CMOS (complementary metal oxide semiconductor) sensor having a plurality of pixels. The optical image formed by the zoom lens system TL (on the light-receiving surface SS of the image sensor SR) is converted into an electrical signal by the image sensor SR. The signal produced by the image sensor SR is subjected to predetermined digital image processing, image compression processing, and the like as required, and is recorded in a memory (such as a semiconductor memory or an optical disk) as a digital video signal; in some cases, the signal is transferred to another device through a cable or after being converted into an infrared signal.

In the image-taking apparatus UT shown in FIG. 13, the zoom lens system TL performs reduction-projection from the subject located on the enlargement side to the image sensor SR located on the reduction side. It is, however, also possible to use instead of the image sensor SR a display device (for example, a liquid crystal display device) that displays a two-dimensional image, and use the zoom lens system TL as a projection lens system. In this way, it is possible to realize an image projection apparatus that performs enlargement-projection from the image display surface located on the reduction side to a screen surface located on the enlargement side. That is, the zoom lens systems TL of all the embodiments described below can be suitably used not only as an image-taking lens system but also as a projection lens system.

FIGS. 1 to 6 are lens construction diagrams corresponding to the zoom lens systems TL used in a first to a sixth embodiment, respectively, of the invention, each showing the lens construction as observed at the wide-angle end W in an optical section. In each lens construction diagram, a surface marked as ri (i=1, 2, 3, . . . ) is the i-th surface from the object side (with an asterisk (*) following ri indicating an aspherical surface), and an axial distance marked as di (i=1, 2, 3, . . . ) is the i-th axial distance from the object side, though only those axial distances which vary as zooming is performed, i.e., variable axial distances, are shown here. A lens element marked as Lj (j=1, 2, 3, . . . ) is the j-th lens element from the object side, with a letter "p" following Lj indicating a plastic lens element. Moreover, in each lens construction diagram, arrows m1, m2, and m3 schematically indicate the movement of the first, second, and third lens units Gr1, Gr2, and Gr3, respectively, during zooming from the wide-angle end W to the telephoto end T, and a straight line m4 indicates that the parallel-plane plate PL is kept in a fixed position during zooming. In all the embodiments, during zooming, the first lens unit Gr1 moves first toward the image side and then slightly back toward the object side as if to make a U-turn, and the second lens unit Gr2 moves straight toward the object side. During zooming, the third lens unit Gr3 remains in a fixed position in the first and second embodiments, and moves toward the image side in the third to sixth embodiments.

In all of the first to sixth embodiments, the zoom lens system TL is constructed as a three-unit zoom lens system that is composed of, from the object side thereof, a first lens unit GR1 having a negative optical power (an optical power is a quantity defined as the reciprocal of a focal length), a second lens unit GR2 having a positive optical power, and a third lens unit GR3 having a positive optical power and that achieves zooming by moving at least the first and second lens units GR1 and GR2 in such a way as to vary the distances between the individual lens units. During zooming from the wide-angle end W to the telephoto end T, the second lens unit Gr2 moves toward the object side so that the distance between the first and second lens units Gr1 and Gr2 decreases. That is, zooming is achieved as a result of the second lens unit Gr2 moving toward the object side so as to function as a variator, and the resulting deviation of the focal point is corrected by the movement of the first lens unit Gr1. Now, the lens construction of each embodiment will be described in more detail.

In the first embodiment (FIG. 1), in a three-unit zoom construction composed of a negative, a positive, and a positive lens unit, each lens unit is built as follows. The first lens unit Gr1 is composed of, from the object side, a first lens element L1 and a second lens element L2. The first lens element L1 is a biconcave negative plastic lens element having aspherical surfaces on both sides. The second lens element L2 is a positive meniscus glass lens element convex to the object side. The second lens unit Gr2 is composed of, from the object side, an aperture stop ST, a third lens element L3, a cemented lens element formed by cementing together a fourth lens element L4 and a fifth lens element L5, and a sixth lens element L6. The third lens element L3 is a biconvex positive plastic lens element having an aspherical surface on the object side. The fourth lens element L4 is a biconvex positive glass lens element. The fifth lens element L5 is a biconcave negative glass lens element. The sixth lens element L6 is a positive meniscus plastic lens element convex to the object side and having aspherical surfaces on both sides. The third lens unit Gr3 is composed solely of a seventh lens element L7. The seventh lens element L7 is a biconvex positive plastic lens element having an aspherical surface on the object side.

In the second embodiment (FIG. 2), in a three-unit zoom construction composed of a negative, a positive, and a positive lens unit, each lens unit is built as follows. The first lens unit Gr1 is composed of, from the object side, a first lens element L1 and a second lens element L2. The first lens element L1 is a biconcave negative plastic lens element having aspherical surfaces on both sides. The second lens element L2 is a positive meniscus plastic lens element convex to the object side. The second lens unit Gr2 is composed of, from the object side, an aperture stop ST, a third lens element L3, a cemented lens element formed by cementing together a fourth lens element L4 and a fifth lens element L5, and a sixth lens element L6. The third lens element L3 is a biconvex positive plastic lens element having an aspherical surface on the object side. The fourth lens element L4 is a biconvex positive glass lens element. The fifth lens element L5 is a biconcave negative glass lens element. The sixth lens element L6 is a positive meniscus plastic lens element convex to the object side and having aspherical surfaces on both sides. The third lens unit Gr3 is composed solely of a seventh lens element L7. The seventh lens element L7 is a biconvex positive plastic lens element having an aspherical surface on the object side.

In the third embodiment (FIG. 3), in a three-unit zoom construction composed of a negative, a positive, and a positive lens unit, each lens unit is built as follows. The first lens unit Gr1 is composed of, from the object side, a first lens element L1 and a second lens element L2. The first lens element L1 is a biconcave negative plastic lens element having aspherical surfaces on both sides. The second lens element L2 is a positive meniscus glass lens element convex to the object side. The second lens unit Gr2 is composed of, from the object side, an aperture stop ST, a third lens element L3, a fourth lens element L4, and a fifth lens element L5. The third lens element L3 is a biconvex positive plastic lens element having an aspherical surface on the object side. The fourth lens element L4 is a negative meniscus glass lens element concave to the image side. The fifth lens element L5 is a biconvex positive plastic lens element having aspherical surfaces on both sides. The third lens unit Gr3 is composed solely of a sixth lens element L6. The sixth lens element L6 is a positive meniscus plastic lens element convex to the image side and having aspherical surfaces on both sides.

In the fourth embodiment (FIG. 4), in a three-unit zoom construction composed of a negative, a positive, and a positive lens unit, each lens unit is built as follows. The first lens unit Gr1 is composed of, from the object side, a first lens element L1 and a second lens element L2. The first lens element L1 is a biconcave negative plastic lens element having aspherical surfaces on both sides. The second lens element L2 is a positive meniscus plastic lens element convex to the object side. The second lens unit Gr2 is composed of, from the object side, an aperture stop ST, a third lens element L3, a fourth lens element L4, and a fifth lens element L5. The third lens element L3 is a biconvex positive plastic lens element having an aspherical surface on the object side. The fourth lens element L4 is a negative meniscus glass lens element concave to the image side. The fifth lens element L5 is a biconvex positive plastic lens element having aspherical surfaces on both sides. The third lens unit Gr3 is composed solely of a sixth lens element L6. The sixth lens element L6 is a positive meniscus plastic lens element convex to the image side and having aspherical surfaces on both sides.

In the fifth embodiment (FIG. 5), in a three-unit zoom construction composed of a negative, a positive, and a positive lens unit, each lens unit is built as follows. The first lens unit Gr1 is composed of, from the object side, a first lens element L1 and a second lens element L2. The first lens element L1 is a biconcave negative plastic lens element having aspherical surfaces on both sides. The second lens element L2 is a positive meniscus plastic lens element convex to the object side. The second lens unit Gr2 is composed of, from the object side, an aperture stop ST, a third lens element L3, a fourth lens element L4, and a fifth lens element L5. The third lens element L3 is a biconvex positive plastic lens element having an aspherical surface on the object side. The fourth lens element L4 is a biconcave negative plastic lens element. The fifth lens element L5 is a biconvex positive plastic lens element having aspherical surfaces on both sides. The third lens unit Gr3 is composed solely of a sixth lens element L6. The sixth lens element L6 is a positive meniscus plastic lens element convex to the image side and having aspherical surfaces on both sides.

In the sixth embodiment (FIG. 6), in a three-unit zoom construction composed of a negative, a positive, and a positive lens unit, each lens unit is built as follows. The first lens unit Gr1 is composed of, from the object side, a first lens element L1 and a second lens element L2. The first lens element L1 is a biconcave negative plastic lens element having aspherical surfaces on both sides. The second lens element L2 is a positive meniscus plastic lens element convex to the object side and having an aspherical surface on the object side. The second lens unit Gr2 is composed of, from the object side, an aperture stop ST, a cemented lens element formed by cementing together a third lens element L3 and a fourth lens element L4, and a fifth lens element L5. The third lens element L3 is a biconvex positive glass lens element. The fourth lens element L4 is a biconcave negative glass lens element. The fifth lens element L5 is a positive meniscus plastic lens element convex to the object side and having aspherical surfaces on both sides. The third lens unit Gr3 is composed solely of a sixth lens element L6. The sixth lens element L6 is a biconvex positive plastic lens element having aspherical surfaces on both sides.

As described above, in all the embodiments, the first lens unit Gr1 is composed of two lens elements, and the first lens element L1, i.e., the lens element disposed at the object-side end of the first lens unit Gr1, and the last lens element L6 or L7, i.e., the lens element disposed at the image-side end of the third lens unit Gr3, are plastic lens elements. In this way, by disposing a plastic lens element at the image-side end of the third lens unit, disposing another plastic lens element at the object-side end of the first lens unit, which is composed of two or more lens elements, and giving them appropriate optical powers, it is possible to make the zoom lens system satisfactory compact and inexpensive while securing high optical performance. Using the image-taking apparatuses of the embodiments in devices such as digital cameras and portable data terminals contributes to making such devices slim, lightweight, compact, inexpensive, high-performance, intelligent, and otherwise better. Now, the conditions that should preferably be fulfilled to obtain a proper balance among such benefits and to achieve higher optical performance and other advantages will be described.

In the zoom lens system, attempting to simultaneously obtain compactness and a wide angle by increasing the negative optical power of the first lens unit results in making it difficult to correct off-axial aberrations with the spherical surfaces included in the first lens unit alone. On the other hand, attempting to obtain telecentricity by increasing the positive optical power of the last lens element results in making it difficult to correct off-axial aberrations with the spherical surfaces included in the third lens unit alone. For example, attempting to reduce the front lens diameter by increasing the optical power of the first lens element disposed at the object-side end results in producing distortion, which then needs to be corrected. On the other hand, attempting to make the zoom lens system telecentric by increasing the positive optical power of the last lens element disposed at the image-side end results in causing the image plane to lean toward the object side (the under side), which then needs to be corrected. To avoid these inconveniences, in all the embodiments, for easy correction of aberrations, aspherical surfaces are used in the first lens element L1 disposed on the object-side end and the last lens element L6 or L7 disposed on the image-side end. It is preferable that, in this way, at least one surface of the first lens element L1 disposed on the object-side end be an aspherical surface and at least one surface of the last lens element disposed on the image-side end be an aspherical surface. This makes it possible to satisfactorily correct distortion and curvature of field. A lens element having an aspherical surface may be formed as a glass-molded lens element, a composite aspherical-surface lens element, a plastic lens element, or the like. Among these, in terms of the cost-performance ratio, using a lens element formed of plastic helps effectively achieve cost reduction.

It is preferable that the first lens unit be composed of two or more lens elements, and moreover that the first lens element, i.e., the one disposed at the object-side end in the first lens unit, be a plastic lens element, and in addition that conditional formula (1) below be fulfilled.

$$1 < |f1/fw| < 3 \tag{1}$$

where
 f1 represents the focal length of the first lens element; and
 fw represents the focal length of the zoom lens system as a whole at the wide-angle end.

Conditional formula (1) defines the conditional range that should preferably be fulfilled with respect to the optical power of the first lens element formed of plastic. Fulfilling conditional formula (1) makes it possible to reduce the lens diameter and shorten the total length, and simultaneously to reduce costs. If the lower limit of conditional formula (1) is disregarded, the optical power of the first lens element is so strong that it is difficult to correct aberrations. This leads, for example, to problems such as excessively large negative distortion or over-side curvature of field. By contrast, if the upper limit of conditional formula (1) is disregarded, whereas aberrations can be corrected favorably, the lens diameter or the total length is unduly great, making the zoom lens system as a whole unduly large.

It is further preferable that conditional formula (1a) below be fulfilled.

$$1 < |f1/fw| < 2 \tag{1a}$$

This conditional formula (1a) defines a further preferable conditional range within that defined by conditional formula (1) above from the above-mentioned viewpoints and out of other considerations.

It is preferable that, as in all the embodiments, at least one surface of the first lens element be an aspherical surface, and it is preferable that the first lens element have a negative optical power and in addition include at least one aspherical surface. Using at least one aspherical surface there makes it possible to satisfactorily correct aberrations such as distortion and curvature of field, and to make the zoom lens system as a whole compact. It is further preferable that the image-side surface of the first lens element be an aspherical surface. To correct the negative distortion produced by the first lens element, it is necessary to use an aspherical surface of which the optical power decreases toward the edge. By introducing such an aspherical surface as the image-side surface, so long as the first lens element is concave to the image side as in all the embodiments, it is possible to reduce the distance from the first lens element to the lens element disposed on the image side thereof, and thereby to reduce the total lens length.

As described above, it is preferable that the aspherical surface used in the first lens element—a negative plastic lens element—included in the first lens unit be so shaped that the optical power thereof decreases toward the edge. Specifically, assuming that the image-side surface of the first lens element is an spherical surface, that the effective radius of the aspherical surface is represented by Y, and that the height in a direction perpendicular to the optical axis is represented by y, it is preferable that, for an arbitrary height y in the range of $0.8Y \leq y \leq Y$, the aspherical surface forming the image-side surface of the first lens element fulfill conditional formula (2) below.

$$-0.3 \leq \phi \cdot (N'-N) \cdot d[x(y)-x0(y)]/dy \leq 0 \qquad (2)$$

where $\phi$ represents the optical power (mm$^{-1}$) of the image-side surface of the lens element having the aspherical surface;

N represents the refractive index for the d-line of the medium present on the object side of the aspherical surface;

N' represents the refractive index for the d-line of the medium present on the image side of the aspherical surface;

x(y) represents the surface shape of the aspherical surface (the displacement along the optical axis at the height y in the direction perpendicular to the optical axis of the aspherical surface, mm); and x0(y) represents the surface shape of the reference spherical surface for the aspherical surface (the displacement along the optical axis at the height y in the direction perpendicular to the optical axis of the reference spherical surface, mm).

Here, the surface shape x(y) of the aspherical surface and the surface shape x0(y) of the reference spherical surface are given by the following formulae (as) and (re), respectively:

$$x(y) = (C0 \cdot y^2)/(1 + \sqrt{1-\epsilon \cdot C0^2 \cdot y^2}) + \sum A_j y^j$$

$$x0(y) = (C0 \cdot y^2)/(1 + \sqrt{1-C0^2 \cdot y^2})$$

where

C0 represents the curvature (mm$^{-1}$) of the reference spherical surface for the aspherical surface;

$\epsilon$ represents the quadric surface parameter; and

Aj represents the aspherical surface coefficient of j-th order.

Conditional formula (2) defines the conditional range that should preferably be fulfilled with respect to the shape of the aspherical surface. When conditional formula (2) is fulfilled, the aspherical surface is so shaped that the optical power of the first lens unit decreases toward the edge. Thus, when conditional formula (2) is fulfilled, it is possible to properly correct distortion and curvature of field, in particular in the wide-angle region. If the lower limit of conditional formula (2) is disregarded, large positive distortion appears in the wide-angle region, in particular at a close-up distance, and in addition the image plane leans greatly toward the under side. Moreover, it is difficult to correct the coma appearing in off-axial rays in the wide-angle region. By contrast, if the upper limit of conditional formula (2) is disregarded, large negative distortion appears in the wide-angle region, in particular at a close-up distance, and in addition the image plane leans greatly toward the over side.

It is further preferable that conditional formula (2a) below be fulfilled.

$$-0.1 \leq \phi \cdot (N'-N) \cdot d[x(y)-x0(y)]/dy \leq 0 \qquad (2a)$$

This conditional formula (2a) defines a further preferable conditional range within that defined by conditional formula (2) above from the above-mentioned viewpoints and out of other considerations.

In an image-taking apparatus incorporating a zoom lens system, to match the pupil with the microlenses provided so as to correspond to the individual pixels of an image sensor, in particular a high-resolution one, it is necessary to locate the exit pupil position of the zoom lens system comparatively far away from the image plane (i.e., to make the zoom lens system telecentric). To achieve this, it is preferable that, as in all the embodiments, the last lens element be given a positive optical power. Giving the last lens element a positive optical power makes it easy to make off-axial rays travel in the direction parallel to the optical axis and thereby obtain telecentricity.

With respect to the last lens element, i.e., the lens element disposed at the image-side end of the third lens unit, it is preferable that conditional formula (3) below be fulfilled.

$$2 \leq |f3L/f1| \leq 6 \qquad (3)$$

where f1 represents the focal length of the first lens element; and f3L represents the focal length of the last lens element.

Conditional formula (3) defines the conditional range that should preferably be fulfilled with respect to the optical power of the last lens element formed of plastic. Fulfilling conditional formula (3) makes it possible to effectively obtain telecentricity. If the lower limit of conditional formula (3) is disregarded, off-axial rays are incident on the image sensor from directions farther away from the optical axis (an overtelecentric construction), which is undesirable. By contrast, if the upper limit of conditional formula (3) is disregarded, off-axial rays are incident on the image sensor from directions closer to the optical axis (an undertelecentric construction), which also is undesirable.

It is further preferable that conditional formula (3a) below be fulfilled.

$$2 \leq |f3L/f1| \leq 5 \qquad (3a)$$

This conditional formula (3a) defines a further preferable conditional range within that defined by conditional formula (3) above from the above-mentioned viewpoints and out of other considerations.

It is preferable that, as described above, the last lens element have a positive optical power, and in addition that the image-side surface of the last lens element be convex to the image side. Making the image-side surface of the last lens element convex to the image side helps reduce the distance from the third lens unit to the optical filter (such as an optical low-pass filter) as measured in the collapsed state. This helps achieve compactness in the collapsed state.

To make a zoom lens system compact, it is preferable to adopt a rear focus system whereby focusing is achieved by the use of the most image-side lens unit. In a case where the rear focus system is adopted in a three-unit zoom construction composed of a negative, a positive, and a positive lens unit, building the third lens unit with only one lens element makes it possible to reduce the driving force needed for focusing and to achieve fast focusing. Moreover, using a plastic lens element as the last lens element helps achieve weight reduction, which thus helps further reduce the load on the driving systems for focusing and zooming. Accordingly, it is preferable that, as in all the embodiments, the third lens unit be composed of one single lens element.

With respect to the optical power of the first lens unit, it is preferable that conditional formula (4) below be fulfilled.

$$1 < |f1/\sqrt{fw \times ft}| < 3 \quad (4)$$

where f1 represents the focal length of the first lens unit;
fw represents the focal length of the zoom lens system as a whole at the wide-angle end; and
ft represents the focal length of the zoom lens system as a whole at the telephoto end.

Conditional formula (4) defines the conditional range that should preferably be fulfilled with respect to the optical power of the first lens unit. Fulfilling conditional formula (4) makes it possible to more satisfactorily correct distortion. If the lower limit of conditional formula (4) is disregarded, the optical power of the first lens unit is so strong that it is difficult to correct the negative distortion appearing in the wide-angle region. By contrast, if the upper limit of conditional formula (4) is disregarded, the optical power of the first lens unit is so weak that it is difficult to sharply bend off-axial rays with the first lens unit in the wide-angle region so as to reduce the front lens diameter.

It is further preferable that conditional formula (4a) below be fulfilled.

$$1 < |f1/\sqrt{fw \times ft}| < 2 \quad (4a)$$

This conditional formula (4a) defines a further preferable conditional range within that defined by conditional formula (4) above from the above-mentioned viewpoints and out of other considerations.

In all the embodiments, the zoom lens system TL is composed solely of refractive lens elements, which deflect incident light by refraction (i.e. lens elements of the type that deflects light at the interface between two media having different refractive indices). It is possible, however, to replace any of these lens elements with a lens element of any other type, for example, a diffractive lens element, which deflects incident light by diffraction, or a refractive/diffractive hybrid lens element, which deflects incident light by diffraction and refraction combined together, or a gradient index lens element, which deflects incident light with varying refractive indices distributed within a medium. Among these types, gradient index lens elements, which have varying refractive indices distributed within a medium, are expensive because of the complicated fabrication process they require. Therefore, it is preferable to use lens elements formed out of a uniform material.

It is to be understood that the embodiments described above and the practical examples described later include the constructions described below, and with these constructions, it is possible to realize zoom lens systems that offer high optical performance despite being compact. By using them as image-taking lens systems in digital cameras, portable data devices (such as cellular phones and PDAs), and the like, it is possible to contribute to making such devices lightweight, compact, inexpensive, high-performance, intelligent, and otherwise better.

(Z1) A zoom lens system comprising a plurality of lens units and achieving zooming by varying the distances between the lens units, wherein the zoom lens system includes three lens units, namely, from the object side thereof, a first lens unit having a negative optical power, a second lens unit having a positive optical power, and a third lens unit having a positive optical power, the distance between the first and second lens units decreases during zooming from the wide-angle end to the telephoto end, the first lens unit is composed of two or more lens elements, the first lens element, i.e., the lens element disposed at the object-side end of the first lens unit, and the last lens element, i.e., the lens element disposed at the image-side end of the third lens unit, are plastic lens elements, and conditional formula (1) or (1a) noted earlier is fulfilled.

(Z2) A zoom lens system as described in (Z1) above, wherein at least one surface of the first lens element is an aspherical surface.

(Z3) A zoom lens system as described in (Z1) or (Z2) above, wherein, assuming that the image-side surface of the first lens element is an spherical surface, that the effective radius of the aspherical surface is represented by Y, and that the height in a direction perpendicular to the optical axis is represented by y, then, for an arbitrary height y in the range of $0.8Y \leq y \leq Y$, the aspherical surface forming the image-side surface of the first lens element fulfills conditional formula (2) or (2a) noted earlier.

(Z4) A zoom lens system as described in one of (Z1) to (Z3) above, wherein the last lens element has a positive optical power.

(Z5) A zoom lens system as described in one of (Z1) to (Z4) above, wherein conditional formula (3) or (3a) noted earlier is fulfilled.

(Z6) A zoom lens system as described in (Z4) above, wherein the image-side surface of the last lens element is convex to the image side.

(Z7) A zoom lens system as described in one of (Z1) to (Z6) above, wherein the third lens unit is composed of one single lens element.

(Z8) A zoom lens system as described in one of (Z1) to (Z7) above, wherein conditional formula (4) or (4a) noted earlier is fulfilled.

(Z9) A zoom lens system as described in one of (Z1) to (Z8) above, wherein the second lens unit includes an aperture stop at the object-side end thereof.

(U1) An image-taking apparatus comprising a zoom lens system as described in one of (Z1) to (Z9) above and an image sensor for converting the optical image formed by the zoom lens system into an electrical signal.

(C1) A camera comprising an image-taking apparatus as described in (U1) above so as to be used for shooting at least either a still picture of a subject or a moving picture of a subject.

(C2) A camera as described in (C1) above, wherein the camera is a digital camera, video camera, or a camera incorporated in or externally fitted to a cellular phone, personal digital assistant, personal computer, mobile computer, or peripheral device therefor.

(D1) A digital device comprising an image-taking apparatus as described in (U1) above so as to be additionally capable of shooting at least either a still picture of a subject or a moving picture of a subject.

(D2) A digital device as described in (D1) above, wherein the digital device is a cellular phone, personal digital assistant, personal computer, mobile computer, or peripheral device therefor.

EXAMPLES

Hereinafter, the construction and other features of practical examples of the zoom lens system used in an image-taking apparatus embodying the present invention will be presented with reference to their construction data and other data. Examples 1 to 6 presented below are numerical examples corresponding to the first to sixth embodiments, respectively, described hereinbefore, and therefore the optical construction diagrams (FIGS. 1 to 6) of the first to sixth embodiments also show the lens construction of Examples 1 to 6, respectively.

Tables 1 to 6 show the construction data of Examples 1 to 6, respectively. Tables 7 and 8 show the values of the conditional formulae and the data related thereto as actually observed in each example. In the basic optical construction (with "i" representing the surface number) presented in each of Tables 1 to 6, ri (i=1, 2, 3, ...) represents the radius of curvature (in mm) of the i-th surface from the object side, di (i=1, 2, 3, ...) represents the axial distance (in mm) between the i-th and (i+1)-th surfaces from the object side, and Nd and vd respectively represent the refractive index for the d-line and the Abbe number of the optical material filling the axial distance di. For each of those axial distances di which vary during zooming, i.e. variable axial distances, three values are listed, namely, from left, the axial distance observed at the wide-angle end (in the shortest-focal-length state, W), the axial distance observed at the middle (in the middle-focal-length state, M), and the axial distance observed at the telephoto end (in the longest-focal-length state, T). Shown together with these data are the focal length (f, mm) and f-number (FNO) of the entire system observed in those three different focal-length states W, M, and T.

A surface of which the radius of curvature ri is marked with an asterisk (*) is an aspherical surface (a refractive optical surface having an aspherical shape, a surface that exerts a refractive effect equivalent to that of an aspherical surface, or the like). The surface shape of such an aspherical surface is defined by formula (AS) below. The aspherical surface data of the aspherical surfaces used in each example are also shown in Tables 1 to 6. It should be noted, however, that any coefficient that equals zero is omitted, and that, for any relevant data, "E−n" represents "×10$^{-n}$" and "E+n" represents "×10$^{+n}$."

$$X(H)=(C0 \cdot H^2)/(1+mt;epmrl;\sqrt{1-\epsilon \cdot italCmedbeginbold0endboldsup2resetital \cdot Hmedsup2resetrlxmx})+\Sigma(Aj \cdot H^j) \quad (AS)$$

where

X(H) represents the displacement along the optical axis AX at the height H (relative to the vertex);

H represents the height in a direction perpendicular to the optical axis AX;

C0 represents the paraxial curvature (=1/ri);

ε represents the quadric surface parameter; and

Aj represents the aspherical surface coefficient of j-th order.

FIGS. 7A to 7I, FIGS. 8A to 8I, FIGS. 9A to 9I, FIGS. 10A to 10I, FIGS. 11A to 11I, and FIGS. 12A to 12I are aberration diagrams of Examples 1 to 6, respectively, all obtained in the state focused at infinity. Of these aberration diagrams, FIGS. 7A, 7B, 7C, 8A, 8B, 8C, 9A, 9B, 9C, 10A, 10B, 10C, 11A, 11B, 11C, 12A, 12B, and 12C show the aberrations observed at the wide-angle end W, FIGS. 7D, 7E, 7F, 8D, 8E, 8F, 9D, 9E, 9F, 10D, 10E, 10F, 11D, 11E, 11F, 12D, 12E, and 12F show the aberrations observed at the middle M, and FIGS. 7G, 7H, 7I, 8G, 8H, 8L 9G, 9H, 9I, 10G, 10H, 10I, 11G, 11H, 11I, 12G, 12H, and 12I show the aberrations observed at the telephoto end T. Of these aberration diagrams, FIGS. 7A, 7D, 7G, 8A, 8D, 8G, 9A, 9D, 9G, 10A, 10D, 10G, 11A, 11D, 10G, 12A, 12D, and 12G show spherical aberration, FIGS. 7B, 7E, 7H, 8B, 8E, 8H, 9B, 9E, 9H, 10B, 10E, 10H, 11B, 11E, 111H, 12B, 12E, and 12H show astigmatism, and FIGS. 7C, 7F, 7I, 8C, 8F, 8I, 9C, 9F, 9I, 10C, 10F, 10I, 11C, 11F, 11I, 12C, 12F, and 12I show distortion. The symbol FNO represents the f-number, and the symbol Y' (mm) represents the maximum image height (corresponding to the distance from the optical axis AX) on the light-receiving surface SS of the image sensor SR. In the spherical aberration diagrams, the solid line (d) represents the spherical aberration (mm) observed for the d-line, and the broken line (SC) represents the deviation (mm) from the sine condition to be fulfilled. In the astigmatism diagrams, the broken line (DM) and solid line (DS) represent the astigmatism (mm) observed for the d-line on the meridional and sagittal planes, respectively. In the distortion diagrams, the solid line represents the distortion (%) observed for the d-line.

As described above, according to the present invention, in a zoom lens system, a plastic lens element is disposed at the image-side end in a third lens unit, and another plastic lens element is disposed at the object-side end in a first lens unit composed of two or more lens elements, and those plastic lens elements are given appropriate optical powers. This makes it possible to realize an image-taking apparatus incorporating a zoom lens system that offers high optical performance despite being compact and inexpensive. By applying an image-taking apparatus according to the present invention in devices such as digital cameras and portable data terminals, it is possible to contribute to making such devices slim, lightweight, compact, inexpensive, high-performance, intelligent, and otherwise better.

TABLE 1

| Example 1 | | f[mm] | 6.30(W)~10.64(M)~17.96(T) | | | |
| | | FNO | 2.85(W)~3.61(M)~4.90(T) | | | |
| i | ri[mm] | di[mm] | Nd | vd | Element, etc. | |
| 1 | −30.000 | * | | | | Gr1 |
| | | 1.800 | 1.53048 | 55.72 | L1p | (−) |
| 2 | 5.697 | * | | | | |
| | | 3.200 | | | | |
| 3 | 10.514 | | | | | |
| | | 2.400 | 1.84666 | 23.78 | L2 | |
| 4 | 16.914 | | | | | |
| | | 16.407(W)~7.386(M)~2.040(T) | | | | |
| 5 | ∞ | | | | ST | Gr2 |
| | | 0.400 | | | | (+) |
| 6 | 7.900 | * | | | | |
| | | 2.740 | 1.53048 | 55.72 | L3p | |

TABLE 1-continued

| | | | | | | |
|---|---|---|---|---|---|---|
| 7 | −31.432 | | | | | |
| | | | 1.000 | | | |
| 8 | 57.218 | | | | | |
| | | | 1.795 | 1.83500 | 42.98 | L4 |
| 9 | −5.982 | | | | | |
| | | | 0.010 | 1.51400 | 42.83 | |
| 10 | −5.982 | | | | | |
| | | | 1.500 | 1.67270 | 32.17 | L5 |
| 11 | 6.500 | | | | | |
| | | | 1.500 | | | |
| 12 | 10.319 | * | | | | |
| | | | 1.800 | 1.53048 | 55.72 | L6p |
| 13 | 51.261 | * | | | | |
| | | | 5.634(W)~11.475(M)~21.340(T) | | | |
| 14 | 20.473 | * | | | | Gr3 |
| | | | 2.600 | 1.53048 | 55.72 | L7p (+) |
| 15 | −22.367 | | | | | |
| | | | 1.960 | | | |
| 16 | ∞ | | | | | PL |
| | | | 0.500 | 1.54426 | 69.60 | |
| 17 | ∞ | | | | | |
| | | | 1.000 | | | |
| 18 | ∞ | | | | | |
| | | | 0.500 | 1.51680 | 64.20 | |
| 19 | ∞ | | | | | |

Aspherical Surface Data of the i-th Surface (*)

| i | ε | A4 | A6 | A8 | A10 |
|---|---|---|---|---|---|
| 1 | 1.0000 | 0.44744945E−3 | −0.11591475E−4 | 0.11216973E−6 | 0.76497065E−10 |
| 2 | 1.0000 | −0.64781200E−4 | −0.10092577E−4 | −0.73261790E−6 | |
| 6 | 1.0000 | −0.41852051E−3 | −0.27252435E−5 | −0.42991635E−6 | 0.80492163E−8 |
| 12 | 1.0000 | −0.73806365E−3 | −0.25886647E−4 | −0.20251834E−5 | |
| 13 | 1.0000 | −0.45229979E−3 | −0.23849633E−4 | −0.13301782E−5 | |
| 14 | 1.0000 | −0.20237701E−3 | 0.20784626E−5 | −0.46895795E−7 | |

TABLE 2

| Example 2 | | f[mm] | 6.30(W)~10.64(M)~17.96(T) | | | |
|---|---|---|---|---|---|---|
| | | FNO | 2.82(W)~3.59(M)~4.90(T) | | | |
| i | ri[mm] | | di[mm] | Nd | νd | Element, etc. |
| 1 | −31.648 | * | | | | Gr1 |
| | | | 1.800 | 1.53048 | 55.72 | L1p (−) |
| 2 | 5.645 | * | | | | |
| | | | 3.200 | | | |
| 3 | 10.861 | | | | | |
| | | | 2.400 | 1.62017 | 24.01 | L2p |
| 4 | 25.370 | | | | | |
| | | | 16.795(W)~7.486(M)~1.969(T) | | | |
| 5 | ∞ | | | | | ST Gr2 |
| | | | 0.400 | | | (+) |
| 6 | 7.900 | * | | | | |
| | | | 3.056 | 1.53048 | 55.72 | L3p |
| 7 | −19.046 | | | | | |
| | | | 1.000 | | | |
| 8 | 127.253 | | | | | |
| | | | 1.808 | 1.83500 | 42.98 | L4 |
| 9 | −5.668 | | | | | |
| | | | 0.010 | 1.51400 | 42.83 | |
| 10 | −5.668 | | | | | |
| | | | 1.500 | 1.67270 | 32.17 | L5 |
| 11 | 6.500 | | | | | |
| | | | 1.500 | | | |
| 12 | 12.359 | * | | | | |
| | | | 1.800 | 1.53048 | 55.72 | L6p |
| 13 | 44.765 | * | | | | |
| | | | 5.246(W)~10.952(M)~20.590(T) | | | |
| 14 | 19.099 | * | | | | Gr3 |
| | | | 2.381 | 1.53048 | 55.72 | L7p (+) |
| 15 | −22.808 | | | | | |
| | | | 1.960 | | | |
| 16 | ∞ | | | | | PL |
| | | | 0.500 | 1.54426 | 69.60 | |

TABLE 2-continued

| | | | | |
|---|---|---|---|---|
| 17 | ∞ | | | |
| | | 1.000 | | |
| 18 | ∞ | | | |
| | | 0.500 | 1.51680 | 64.20 |
| 19 | ∞ | | | |

Aspherical Surface Data of the i-th Surface (*)

| i | ε | A4 | A6 | A8 | A10 |
|---|---|---|---|---|---|
| 1 | 1.0000 | 0.22141403E−3 | −0.98315512E−6 | −0.12665146E−6 | 0.21892832E−8 |
| 2 | 1.0000 | −0.41319057E−3 | 0.35767279E−5 | −0.10285107E−5 | |
| 6 | 1.0000 | −0.48507047E−3 | −0.36847986E−5 | −0.38677473E−6 | 0.53001741E−8 |
| 12 | 1.0000 | −0.12302973E−2 | −0.34096106E−4 | −0.23506071E−5 | |
| 13 | 1.0000 | −0.90392410E−3 | −0.29013757E−4 | −0.88562562E−6 | |
| 14 | 1.0000 | −0.20228644E−3 | 0.21015759E−5 | −0.48545406E−7 | |

TABLE 3

| Example 3 | | f[mm] | 6.30(W)~10.64(M)~17.96(T) | | |
|---|---|---|---|---|---|
| | | FNO | 2.88(W)~3.69(M)~4.90(T) | | |
| i | ri[mm] | | di[mm] | Nd | νd | Element, etc. |
|---|---|---|---|---|---|---|
| 1 | −25.000 | * | | | | Gr1 |
| | | | 1.800 | 1.53048 | 55.72 | L1p (−) |
| 2 | 5.668 | * | | | | |
| | | | 3.200 | | | |
| 3 | 10.359 | | | | | |
| | | | 2.400 | 1.84666 | 23.78 | L2 |
| 4 | 16.500 | | | | | |
| | | | 16.298(W)~7.821(M)~2.055(T) | | | |
| 5 | ∞ | | | | | ST Gr2 |
| | | | 0.400 | | | (+) |
| 6 | 7.900 | * | | | | |
| | | | 2.809 | 1.53048 | 55.72 | L3p |
| 7 | −23.876 | | | | | |
| | | | 1.500 | | | |
| 8 | 22.299 | | | | | |
| | | | 1.200 | 1.84666 | 23.78 | L4 |
| 9 | 6.500 | | | | | |
| | | | 1.238 | | | |
| 10 | 20.417 | * | | | | |
| | | | 1.545 | 1.53048 | 55.72 | L5p |
| 11 | −11.254 | * | | | | |
| | | | 1.771(W)~10.168(M)~19.975(T) | | | |
| 12 | −18.151 | * | | | | Gr3 |
| | | | 2.600 | 1.53048 | 55.72 | L6p (+) |
| 13 | −10.500 | * | | | | |
| | | | 8.650(W)~6.189(M)~5.045(T) | | | |
| 14 | ∞ | | | | | PL |
| | | | 0.500 | 1.54426 | 69.60 | |
| 15 | ∞ | | | | | |
| | | | 1.000 | | | |
| 16 | ∞ | | | | | |
| | | | 0.500 | 1.51680 | 64.20 | |
| 17 | ∞ | | | | | |

Aspherical Surface Data of the i-th Surface (*)

| i | ε | A4 | A6 | A8 | A10 |
|---|---|---|---|---|---|
| 1 | 1.0000 | 0.57112964E−3 | −0.12526710E−4 | 0.13549573E−6 | −0.25161573E−9 |
| 2 | 1.0000 | 0.93416330E−4 | −0.94560466E−5 | −0.67396767E−6 | |
| 6 | 1.0000 | −0.46095188E−3 | −0.10681392E−5 | −0.44623091E−6 | 0.17036152E−7 |
| 10 | 1.0000 | 0.38492636E−4 | 0.12038875E−4 | 0.66864313E−6 | |
| 11 | 1.0000 | −0.25929376E−3 | 0.54165267E−6 | 0.28014142E−6 | |
| 12 | 1.0000 | −0.50826613E−3 | 0.19095497E−5 | 0.66285447E−6 | |
| 13 | 1.0000 | −0.24468619E−3 | 0.10737027E−5 | 0.39795014E−6 | 0.30605139E−8 |

TABLE 4

| Example 4 | | f[mm] | 6.30(W)~10.64(M)~17.96(T) | | | |
|---|---|---|---|---|---|---|
| | | FNO | 2.82(W)~3.69(M)~4.90(T) | | | |
| i | ri[mm] | di[mm] | Nd | νd | Element, etc. | |
| 1 | −25.000 | * | | | | Gr1 |
| | | 1.800 | 1.53048 | 55.72 | L1p | (−) |
| 2 | 5.560 | * | | | | |
| | | 3.200 | | | | |
| 3 | 10.435 | | | | | |
| | | 2.400 | 1.62017 | 24.01 | L2p | |
| 4 | 24.828 | | | | | |
| | | 16.487(W)~8.175(M)~1.980(T) | | | | |
| 5 | ∞ | | | | ST | Gr2 |
| | | 0.400 | | | | (+) |
| 6 | 7.900 | * | | | | |
| | | 3.021 | 1.53048 | 55.72 | L3p | |
| 7 | −18.816 | | | | | |
| | | 1.105 | | | | |
| 8 | 24.905 | | | | | |
| | | 1.747 | 1.84666 | 23.78 | L4 | |
| 9 | 6.500 | | | | | |
| | | 1.086 | | | | |
| 10 | 27.546 | * | | | | |
| | | 1.536 | 1.53048 | 55.72 | L5p | |
| 11 | −11.298 | * | | | | |
| | | 1.113(W)~10.432(M)~19.676(T) | | | | |
| 12 | −18.638 | * | | | | Gr3 |
| | | 2.600 | 1.53048 | 55.72 | L6p | (+) |
| 13 | −10.500 | * | | | | |
| | | 8.773(W)~5.406(M)~4.491(T) | | | | |
| 14 | ∞ | | | | PL | |
| | | 0.500 | 1.54426 | 69.60 | | |
| 15 | ∞ | | | | | |
| | | 1.000 | | | | |
| 16 | ∞ | | | | | |
| | | 0.500 | 1.51680 | 64.20 | | |
| 17 | ∞ | | | | | |

| Aspherical Surface Data of the i-th Surface (*) | | | | | |
|---|---|---|---|---|---|
| i | ε | A4 | A6 | A8 | A10 |
| 1 | 1.0000 | 0.55687902E−3 | −0.12374547E−4 | 0.12988854E−6 | −0.10555620E−9 |
| 2 | 1.0000 | 0.13716209E−4 | −0.91950299E−5 | −0.80543371E−6 | |
| 6 | 1.0000 | −0.49267353E−3 | −0.26116803E−5 | −0.40517655E−6 | 0.15058552E−7 |
| 10 | 1.0000 | 0.67619292E−4 | 0.19818573E−4 | 0.21955253E−5 | |
| 11 | 1.0000 | −0.22249106E−3 | 0.11659038E−5 | 0.17282750E−5 | |
| 12 | 1.0000 | −0.58296207E−3 | −0.56813869E−5 | 0.80719309E−6 | |
| 13 | 1.0000 | −0.32961992E−3 | −0.47605930E−5 | 0.53506872E−6 | 0.82654839E−9 |

TABLE 5

| Example 5 | | f[mm] | 6.30(W)~10.64(M)~17.96(T) | | | |
|---|---|---|---|---|---|---|
| | | FNO | 2.77(W)~3.71(M)~4.90(T) | | | |
| i | ri[mm] | di[mm] | Nd | νd | Element, etc. | |
| 1 | −25.000 | * | | | | Gr1 |
| | | 1.800 | 1.53048 | 55.72 | L1p | (−) |
| 2 | 5.631 | * | | | | |
| | | 3.200 | | | | |
| 3 | 10.476 | | | | | |
| | | 2.400 | 1.62017 | 24.01 | L2p | |
| 4 | 25.427 | | | | | |
| | | 16.151(W)~8.449(M)~1.974(T) | | | | |
| 5 | ∞ | | | | ST | Gr2 |
| | | 0.400 | | | | (+) |
| 6 | 7.900 | * | | | | |
| | | 3.500 | 1.53048 | 55.72 | L3p | |
| 7 | −15.453 | | | | | |
| | | 0.981 | | | | |
| 8 | −150.324 | | | | | |
| | | 1.275 | 1.62017 | 24.01 | L4p | |
| 9 | 7.278 | | | | | |
| | | 1.055 | | | | |

TABLE 5-continued

| | | | | | | | |
|---|---|---|---|---|---|---|---|
| 10 | 36.370 | * | | | | | |
| | | | 1.453 | 1.53048 | 55.72 | L5p | |
| 11 | −12.270 | * | | | | | |
| | | | 1.162(W)~11.714(M)~20.715(T) | | | | |
| 12 | −19.803 | * | | | | | Gr3 |
| | | | 2.600 | 1.53048 | 55.72 | L6p | (+) |
| 13 | −10.500 | * | | | | | |
| | | | 8.836(W)~4.414(M)~3.473(T) | | | | |
| 14 | ∞ | | | | | PL | |
| | | | 0.500 | 1.54426 | 69.60 | | |
| 15 | ∞ | | | | | | |
| | | | 1.000 | | | | |
| 16 | ∞ | | | | | | |
| | | | 0.500 | 1.51680 | 64.20 | | |
| 17 | ∞ | | | | | | |

| Aspherical Surface Data of the i-th Surface (*) | | | | |
|---|---|---|---|---|
| i | ε | A4 | A6 | A8 | A10 |
| 1 | 1.0000 | 0.56843192E−3 | −0.13048405E−4 | 0.16287690E−6 | −0.54585140E−9 |
| 2 | 1.0000 | 0.62684530E−4 | −0.10369037E−4 | −0.65389889E−6 | |
| 6 | 1.0000 | −0.44881137E−3 | −0.38180637E−5 | −0.39267352E−6 | 0.15576222E−7 |
| 10 | 1.0000 | −0.14868000E−4 | 0.25755382E−4 | 0.30151679E−5 | |
| 11 | 1.0000 | −0.66014131E−4 | 0.88971029E−5 | 0.30528981E−5 | |
| 12 | 1.0000 | −0.63415399E−3 | −0.10673603E−4 | 0.87414357E−6 | |
| 13 | 1.0000 | −0.38037830E−3 | −0.92205726E−5 | 0.70526678E−6 | −0.23456065E−8 |

TABLE 6

| Example 6 | | f[mm] | 6.30(w)~10.64(M)~17.96(T) | | | |
|---|---|---|---|---|---|---|
| | | FNO | 2.88(W)~3.54(M)~4.90(T) | | | |
| i | ri[mm] | | di[mm] | Nd | νd | Element, etc. |
| 1 | −40.214 | * | | | | | Gr1 |
| | | | 1.800 | 1.53048 | 55.72 | L1p | (−) |
| 2 | 6.703 | * | | | | | |
| | | | 3.500 | | | | |
| 3 | 11.180 | * | | | | | |
| | | | 2.400 | 1.62017 | 24.01 | L2p | |
| 4 | 23.002 | | | | | | |
| | | | 18.604(W)~6.886(M)~1.158(T) | | | | |
| 5 | ∞ | | | | | ST | Gr2 |
| | | | 1.000 | | | | (+) |
| 6 | 7.118 | | | | | | |
| | | | 3.500 | 1.83481 | 42.72 | L3 | |
| 7 | −12.681 | | | | | | |
| | | | 0.010 | 1.51400 | 42.83 | | |
| 8 | −12.681 | | | | | | |
| | | | 1.200 | 1.80518 | 25.46 | L4 | |
| 9 | 8.691 | | | | | | |
| | | | 1.200 | | | | |
| 10 | 5.234 | * | | | | | |
| | | | 1.800 | 1.53048 | 55.72 | L5p | |
| 11 | 6.338 | * | | | | | |
| | | | 4.366(W)~8.076(M)~16.370(T) | | | | |
| 12 | 19.777 | * | | | | | Gr3 |
| | | | 2.600 | 1.53048 | 55.72 | L6p | (+) |
| 13 | −33.303 | * | | | | | |
| | | | 2.775(W)~3.106(M)~1.412(T) | | | | |
| 14 | ∞ | | | | | PL | |
| | | | 1.000 | 1.54426 | 69.60 | | |
| 15 | ∞ | | | | | | |

| Aspherical Surface Data of the i-th Surface (*) | | | | |
|---|---|---|---|---|
| i | ε | A4 | A6 | A8 | A10 |
| 1 | 1.0000 | 0.65827515E−3 | −0.19707352E−4 | 0.27504984E−6 | −0.18864547E−8 |
| 2 | 1.0000 | 0.52332489E−3 | −0.77608889E−5 | −0.65727495E−6 | |
| 3 | 1.0000 | 0.15198955E−4 | 0.47645959E−5 | −0.21092830E−6 | |
| 10 | 1.0000 | −0.40606058E−3 | −0.50542040E−4 | −0.69204997E−5 | |
| 11 | 1.0000 | 0.17675780E−2 | −0.69367389E−5 | −0.10756071E−4 | |

TABLE 6-continued

| 12 | 1.0000 | −0.53378966E−3 | 0.40002221E−4 | −0.15785796E−5 | |
| 13 | 1.0000 | −0.44715137E−3 | 0.60968912E−5 | 0.11947368E−5 | −0.74835983E−7 |

TABLE 7

| Example | Conditional Formula (1), (1a) $\|f1_1/fw\|$ | Conditional Formula (3), (3a) $\|f3L/f1_1\|$ | Conditional Formula (4), (4a) $\|f1/\sqrt{(fw \times ft)}\|$ |
|---|---|---|---|
| 1 | 1.407937 | 2.320473 | 1.329332 |
| 2 | 1.409841 | 2.250359 | 1.367834 |
| 3 | 1.355079 | 4.921169 | 1.257838 |
| 4 | 1.333651 | 4.857356 | 1.3077 |
| 5 | 1.347619 | 4.511519 | 1.339368 |
| 6 | 1.696667 | 2.22613 | 1.678094 |

TABLE 8

Image-Side Surface of First Lens Element (Second Surface)

Conditional Formula (2), (2a):
$\phi \cdot (N' - N) \cdot d\{x(y) - x0(y)\}/dy$

| Example | y = 0.8Y | y = 0.9Y | y = 1.0Y | Y(mm) |
|---|---|---|---|---|
| 1 | −0.0064 | −0.0128 | −0.0244 | 4.75 |
| 2 | −0.0084 | −0.0156 | −0.0286 | 4.75 |
| 3 | −0.0046 | −0.0103 | −0.0208 | 4.8 |
| 4 | −0.0041 | −0.0087 | −0.0171 | 4.5 |
| 5 | −0.0033 | −0.0072 | −0.0143 | 4.5 |
| 6 | −0.0021 | −0.0093 | −0.0247 | 5.4 |

What is claimed is:

1. A zoom lens system for forming an optical image of a subject on an image-sensing surface of an image sensor,
wherein the zoom lens system comprises three lens units, namely, from an object side thereof, a first lens unit having a negative optical power, a second lens unit having a positive optical power, and a third lens unit having a positive optical power,
wherein the zoom lens system achieves zooming by varying distances between the individual lens units in such a way that, during zooming from a wide-angle end to a telephoto end, a distance between the first and second lens units decreases,
wherein the first lens unit comprises two or more lens elements,
wherein a first lens element, i.e., a lens element disposed at an object-side end of the first lens unit, and a last lens element, i.e., a lens element disposed at an image-side end of the third lens unit, are plastic lens elements, and
wherein the following conditional formula (1) is fulfilled:

$1 < |f1_1/fw| < 3$ (1)

where
f1₁ represents a focal length of the first lens element; and
fw represents a focal length of the zoom lens system as a whole at the wide-angle end.

2. A zoom lens system as claimed in claim 1,
wherein at least one surface of the first lens element is an aspherical surface.

3. A zoom lens system as claimed in claim 1,
wherein, assuming that an image-side surface of the first lens element is an spherical surface, that an effective radius of the aspherical surface is represented by Y, and that a height in a direction perpendicular to an optical axis is represented by y, then, for an arbitrary height y in a range of 0.8Y≦y≦Y, the aspherical surface forming the image-side surface of the first lens element fulfills the following conditional formula (2):

$-0.3 \leq \phi \cdot (N'-N) \cdot d[x(y)-x0(y)]/dy \leq 0$ (2)

where
φ represents an optical power (mm⁻¹) of the image-side surface of the lens element having the aspherical surface;
N represents a refractive index for a d-line of a medium present on an object side of the aspherical surface;
N' represents a refractive index for a d-line of a medium present on an image side of the aspherical surface;
x(y) represents a surface shape of the aspherical surface (a displacement along the optical axis at the height y in the direction perpendicular to the optical axis of the aspherical surface, mm); and
x0(y) represents a surface shape of a reference spherical surface for the aspherical surface (a displacement along the optical axis at the height y in the direction perpendicular to the optical axis of the reference spherical surface, mm).

4. A zoom lens system as claimed in claim 1,
wherein the last lens element has a positive optical power.

5. A zoom lens system as claimed in claim 4,
wherein an image-side surface of the last lens element is convex to an image side.

6. A zoom lens system as claimed in claim 1,
wherein the following conditional formula (3) is fulfilled:

$2 \leq |f3L/f1_1| \leq 6$ (3)

where
f1₁ represents a focal length of the first lens element; and
f3L represents a focal length of the last lens element.

7. A zoom lens system as claimed in claim 1,
wherein the third lens unit consists of one single lens element.

8. A zoom lens system as claimed in claim 1,
wherein the following conditional formula (4) is fulfilled:

$1 < |f1/\sqrt{fw \times ft}| < 3$ (4)

where
f1 represents a focal length of the first lens unit;
fw represents a focal length of the zoom lens system as a whole at the wide-angle end; and
ft represents a focal length of the zoom lens system as a whole at the telephoto end.

9. An image-taking apparatus comprising a zoom lens system that comprises a plurality of lens units and that achieves zooming by varying distances between the lens units and an image sensor that converts an optical image formed by the zoom lens system into an electrical signal,
wherein the zoom lens system comprises three lens units, namely, from an object side thereof, a first lens unit having a negative optical power, a second lens unit having a positive optical power, and a third lens unit having a positive optical power, wherein, during zooming from a wide-angle end to a telephoto end, a distance between the first and second lens units decreases, wherein the first lens unit comprises two or more lens elements, wherein a first lens element, i.e., a lens element disposed at an object-side end of the first lens unit, and a last lens element, i.e., a lens element disposed at an image-side end of the third lens unit, are plastic lens elements, and wherein the following conditional formula (1) is fulfilled:

$$1 < |f1/fw| < 3 \quad (1)$$

where f1 represents a focal length of the first lens element; and fw represents a focal length of the zoom lens system as a whole at the wide-angle end.

10. An image-taking apparatus as claimed in claim 9,
wherein at least one surface of the first lens element is an aspherical surface.

11. An image-taking apparatus as claimed in claim 9,
wherein, assuming that an image-side surface of the first lens element is an spherical surface, that an effective radius of the aspherical surface is represented by Y, and that a height in a direction perpendicular to an optical axis is represented by y, then, for an arbitrary height y in a range of $0.8Y \leq y \leq Y$, the aspherical surface forming the image-side surface of the first lens element fulfills the following conditional formula (2):

$$-0.3 \leq \phi \cdot (N'-N) \cdot d[x(y)-x0(y)]/dy \leq 0 \quad (2)$$

where

φ represents an optical power (mm$^{-1}$) of the image-side surface of the lens element having the aspherical surface;

N represents a refractive index for a d-line of a medium present on an object side of the aspherical surface;

N' represents a refractive index for a d-line of a medium present on an image side of the aspherical surface;

x(y) represents a surface shape of the aspherical surface (a displacement along the optical axis at the height y in the direction perpendicular to the optical axis of the aspherical surface, mm); and x0(y) represents a surface shape of a reference spherical surface for the aspherical surface (a displacement along the optical axis at the height y in the direction perpendicular to the optical axis of the reference spherical surface, mm).

12. An image-taking apparatus as claimed in claim 9,
wherein the last lens element has a positive optical power.

13. An image-taking apparatus as claimed in claim 12,
wherein an image-side surface of the last lens element is convex to an image side.

14. An image-taking apparatus as claimed in claim 9,
wherein the following conditional formula (3) is fulfilled:

$$2 \leq |f3L/f1| \leq 6 \quad (3)$$

where f1 represents a focal length of the first lens element; and f3L represents a focal length of the last lens element.

15. An image-taking apparatus as claimed in claim 9,
wherein the third lens unit consists of one single lens element.

16. An image-taking apparatus as claimed in claim 9,
wherein the following conditional formula (4) is fulfilled:

$$1 < |ft/\sqrt{fw \times ft}| < 3 \quad (4)$$

where f1 represents a focal length of the first lens unit;

fw represents a focal length of the zoom lens system as a whole at the wide-angle end; and ft represents a focal length of the zoom lens system as a whole at the telephoto end.

17. A camera comprising an image-taking apparatus that takes in an image of a subject optically and that then outputs the optical image in a form of an electrical signal, wherein the image-taking apparatus comprises a zoom lens system that comprises a plurality of lens units and that achieves zooming by varying distances between the lens units and an image sensor that converts an optical image formed by the zoom lens system into an electrical signal, wherein the zoom lens system comprises three lens units, namely, from an object side thereof, a first lens unit having a negative optical power, a second lens unit having a positive optical power, and a third lens unit having a positive optical power, wherein, during zooming from a wide-angle end to a telephoto end, a distance between the first and second lens units decreases, wherein the first lens unit comprises two or more lens elements, wherein a first lens element, i.e., a lens element disposed at an object-side end of the first lens unit, and a last lens element, i.e., a lens element disposed at an image-side end of the third lens unit, are plastic lens elements, and wherein the following conditional formula (1) is fulfilled:

$$1 < |f1/fw| < 3 \quad (1)$$

where f1 represents a focal length of the first lens element; and fw represents a focal length of the zoom lens system as a whole at the wide-angle end.

18. A camera as claimed in claim 17,
wherein, assuming that an image-side surface of the first lens element is an spherical surface, that an effective radius of the aspherical surface is represented by Y, and that a height in a direction perpendicular to an optical axis is represented by y, then, for an arbitrary height y in a range of $0.8Y \leq y \leq Y$, the aspherical surface forming the image-side surface of the first lens element fulfills the following conditional formula (2):

$$-0.3 \leq \phi \cdot (N'-N) \cdot d[x(y)-x0(y)]/dy \leq 0 \quad (2)$$

where

φ represents an optical power (mm$^{-1}$) of the image-side surface of the lens element having the aspherical surface;

N represents a refractive index for a d-line of a medium present on an object side of the aspherical surface;

N' represents a refractive index for a d-line of a medium present on an image side of the aspherical surface;

x(y) represents a surface shape of the aspherical surface (a displacement along the optical axis at the height y in the direction perpendicular to the optical axis of the aspherical surface, mm); and x0(y) represents a surface shape of a reference spherical surface for the aspherical surface (a displacement along the optical axis at the height y in the direction perpendicular to the optical axis of the reference spherical surface, mm).

19. A camera as claimed in claim 17,
wherein the following conditional formula (3) is fulfilled:

$$2 \leq |f3L/f1| \leq 6 \quad (3)$$

where
- f1 represents a focal length of the first lens element; and
- f3L represents a focal length of the last lens element.

20. A camera as claimed in claim 17,
wherein the following conditional formula (4) is fulfilled:

$$1 < |f1/\sqrt{fw \times ft}| < 3 \qquad (4)$$

where
- fl represents a focal length of the first lens unit;
- fw represents a focal length of the zoom lens system as a whole at the wide-angle end; and
- ft represents a focal length of the zoom lens system as a whole at the telephoto end.

* * * * *